US010454585B2

(12) United States Patent
Cao et al.

(10) Patent No.: US 10,454,585 B2
(45) Date of Patent: Oct. 22, 2019

(54) DATA CENTER NETWORK SYSTEM AND SIGNAL TRANSMISSION SYSTEM

(71) Applicant: Huawei Technologies Co., Ltd., Shenzhen (CN)

(72) Inventors: Yaobing Cao, Shenzhen (CN); Qinghua Yan, Beijing (CN); Liqing Su, Shenzhen (CN); Di Hu, Shenzhen (CN); Jixian Qu, Beijing (CN); Chuanbing Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/991,830

(22) Filed: May 29, 2018

(65) Prior Publication Data
US 2018/0278331 A1 Sep. 27, 2018

Related U.S. Application Data

(63) Continuation of application No. PCT/CN2016/079329, filed on Apr. 14, 2016.

(30) Foreign Application Priority Data

Nov. 30, 2015 (CN) .......................... 2015 1 0859557

(51) Int. Cl.
*H04B 10/272* (2013.01)
*H04J 14/02* (2006.01)
(Continued)

(52) U.S. Cl.
CPC ........ *H04B 10/272* (2013.01); *H04J 14/0202* (2013.01); *H04J 14/0217* (2013.01);
(Continued)

(58) Field of Classification Search
None
See application file for complete search history.

(56) References Cited

U.S. PATENT DOCUMENTS 8,965,203 B1 * 2/2015 Vandat ................ H04J 14/0282
385/16
9,166,692 B1 * 10/2015 Felderman ............ H04B 10/27
(Continued)

FOREIGN PATENT DOCUMENTS

CN 1745529 A 3/2006
CN 102771092 A 11/2012
(Continued)

OTHER PUBLICATIONS

Foreign Communication From a Counterpart Application, European Application No. 16869529.4, Extended European Search Report dated Sep. 11, 2018, 8 pages.
(Continued)

*Primary Examiner* — Li Liu
(74) *Attorney, Agent, or Firm* — Conley Rode, P.C.

(57) ABSTRACT

A data center network system and a signal transmission system, where the signal transmission system includes one hub device, at least two switches, multiple colored optical modules, at least two multiplexers/demultiplexers, and at least two servers. The hub device, the at least two switches, the multiple colored optical modules, the at least two multiplexers/demultiplexers, and the at least two servers form a star network topology structure.

19 Claims, 13 Drawing Sheets

(51) Int. Cl.
*H04L 12/44* (2006.01)
*H04Q 11/00* (2006.01)

(52) U.S. Cl.
CPC ...... *H04J 14/0227* (2013.01); *H04J 14/0232* (2013.01); *H04J 14/0282* (2013.01); *H04L 12/44* (2013.01); *H04Q 11/0062* (2013.01); *H04Q 2011/0022* (2013.01); *H04Q 2011/0032* (2013.01); *H04Q 2011/0088* (2013.01); *H04Q 2011/0094* (2013.01)

(56) References Cited

U.S. PATENT DOCUMENTS

| | | | | |
|---|---|---|---|---|
| 9,706,276 | B2* | 7/2017 | Rickman | H04Q 11/0071 |
| 9,894,427 | B2* | 2/2018 | Sindhu | H04Q 11/0066 |
| 2001/0026384 | A1 | 10/2001 | Sakano et al. | |
| 2006/0153496 | A1* | 7/2006 | Tanobe | H04J 14/0227 385/24 |
| 2006/0171712 | A1* | 8/2006 | Tanaka | H04Q 11/0062 398/45 |
| 2007/0177589 | A1 | 8/2007 | Endo | |
| 2012/0008945 | A1* | 1/2012 | Singla | H04J 14/0204 398/49 |
| 2012/0099863 | A1* | 4/2012 | Xu | H04Q 11/0005 398/49 |
| 2012/0317138 | A1 | 12/2012 | Kitaichi et al. | |
| 2014/0056371 | A1* | 2/2014 | Ji | H04L 27/2697 375/260 |
| 2014/0119728 | A1* | 5/2014 | Zhang | H04J 14/0204 398/48 |
| 2014/0270761 | A1* | 9/2014 | Xu | H04Q 11/0005 398/45 |
| 2014/0334818 | A1* | 11/2014 | Mehrvar | H04Q 11/0066 398/51 |
| 2014/0334821 | A1* | 11/2014 | Mehrvar | H04Q 11/0005 398/54 |
| 2014/0341568 | A1* | 11/2014 | Zhang | H04J 14/0212 398/34 |
| 2015/0098700 | A1* | 4/2015 | Zhu | H04Q 11/0005 398/48 |
| 2015/0117860 | A1* | 4/2015 | Braun | H04J 14/0282 398/58 |
| 2015/0289035 | A1* | 10/2015 | Mehrvar | H04L 49/356 398/51 |
| 2015/0312657 | A1* | 10/2015 | Yan | H04Q 11/0005 398/48 |
| 2015/0312659 | A1* | 10/2015 | Mehrvar | H04Q 11/0005 398/45 |
| 2016/0212510 | A1* | 7/2016 | Bogoni | H04J 14/04 |
| 2016/0277816 | A1* | 9/2016 | Yuang | H04Q 11/0005 |
| 2017/0019168 | A1* | 1/2017 | Menard | G02B 6/29395 |
| 2017/0105060 | A1* | 4/2017 | Oltman | H04Q 11/0005 |
| 2018/0091251 | A1* | 3/2018 | Hanneman, Jr. | G02B 6/293 |

FOREIGN PATENT DOCUMENTS

| | | |
|---|---|---|
| CN | 104267295 A | 1/2015 |
| EP | 1131910 B1 | 9/2009 |
| EP | 2938094 A1 | 10/2015 |

OTHER PUBLICATIONS

Machine Translation and Abstract of Chinese Publication No. CN104267295, Jan. 7, 2015, 5 pages.
Foreign Communication From a Counterpart Application, PCT Application No. PCT/CN2016/079329, English Translation of International Search Report dated Aug. 19, 2016, 2 pages.

* cited by examiner

900

A source switch receives at least two electrical signals, and separately processes each of the at least two signals according to the following processing manner for the first electrical signal: determining an input/output port corresponding to a destination address carried in the first electrical signal, and outputting the first electrical signal using the determined input/output port. Colored optical modules in the source switch convert the electrical signals received by the source switch into optical signals with specific wavelengths. A source multiplexer/demultiplexer in the source switch performs wavelength division multiplexing on the optical signals obtained by means of conversion by the colored optical modules to form a combined signal, and sends the combined signal to a hub device

910

The hub device receives the combined signal sent by the source multiplexer/demultiplexer, demultiplexes the combined signal to obtain multiple optical signals, sends each of the multiple optical signals to a port corresponding to a destination switch of the optical signal, outputs each optical signal from the corresponding port, and performs wavelength division multiplexing on optical signals output from a same port to form a combined signal

920

A destination multiplexer/demultiplexer in the destination switch receives the combined signal from the hub device, demultiplexes the combined signal to obtain multiple optical signals, and separately inputs the multiple optical signals to colored optical modules that are in the destination switch and that are corresponding to wavelengths of the optical signals. A colored optical module in the destination switch converts an optical signal sent by the destination multiplexer/demultiplexer into an electrical signal, and outputs the electrical signal to an input/output port of a destination switch that has a communication connection to the colored optical module. The destination switch obtains a destination address carried in the received electrical signal, and sends the electrical signal to a destination server indicated by the destination address

FIG. 9

DATA CENTER NETWORK SYSTEM AND SIGNAL TRANSMISSION SYSTEM

CROSS-REFERENCE TO RELATED APPLICATIONS

This application is a continuation of International Patent Application No. PCT/CN2016/079329 filed on Apr. 14, 2016, which claims priority to Chinese Patent Application No. 201510859557.5 filed on Nov. 30, 2015. The disclosures of the aforementioned applications are hereby incorporated by reference in their entireties.

TECHNICAL FIELD

The present disclosure relates to the field of communications technologies, and in particular, to a data center network system and a signal transmission system.

BACKGROUND

A data center network is a network applied to a data center, and mainly includes a large quantity of layer 2 access devices and a small quantity of layer 3 devices. Referring to FIG. 1, a data center network is of a layered structure of hierarchical aggregation, and generally includes three layers, an access layer, an aggregation layer, and a core layer.

Referring to FIG. 1, in the layered structure of hierarchical aggregation, when a server 1 needs to send a signal to a server 2, because the server 1 and the server 2 belong to different access layer devices, the server 1 needs to send the signal to an access layer device 1 corresponding to the server 1, and the access layer device 1 needs to send the signal to an aggregation layer device 1. Because the aggregation layer device 1 manages an access layer device 2 to which the server 2 belongs, the aggregation layer device 1 sends the signal to the access layer device 2, and the access layer device 2 sends the signal to the server 2.

It may be learned that a conventional layered structure of hierarchical aggregation is equivalent to a tree-like structure. A signal sent by each server needs to be forwarded by an aggregation layer device and/or a core layer device. With a requirement of an ever-growing quantity of signals to be transmitted, there is an increasingly high requirement on performance of the aggregation layer device and the core layer device. However, an aggregation layer device and a core network device that are with high performance bring about a problem of high networking costs and a subsequent device maintenance difficulty.

Currently, the problem of high networking costs and a device maintenance difficulty in the conventional data center network is usually resolved using a method of removing devices in the conventional data center network, such as the aggregation layer device and the core layer device. That is, a layered architecture of hierarchical aggregation is reconstructed to be a decentralized mesh architecture such that a physical connection channel exists between every two switches. When any server needs to access another server, the server may communicate with the other server using a physical connection channel between a switch connected to the any server and a switch connected to the other server. In this technical solution, a transmission bottleneck problem caused by the aggregation layer device and the core layer device in a signal transmission process is resolved and a purpose of decentralization is achieved, but there is a problem of a large quantity of layout cables in the solution because a direct connection channel is needed between every two switch devices.

It may be learned that the current data center network has the problem of a large quantity of layout cables and a maintenance difficulty.

SUMMARY

Embodiments of the present disclosure provide a data center network system and a signal transmission system in order to resolve a problem of a large quantity of layout cables and a maintenance difficulty in a conventional data center network.

Specific technical solutions provided in the embodiments of the present disclosure are as follows.

According to a first aspect, a data center network system is provided, including one hub device, at least two switches, multiple colored optical modules, at least two multiplexers/demultiplexers, and at least two servers, where there is a communication connection between at least one of the at least two switches and at least one server, and there are communication connections between different input/output ports of each switch and different colored optical modules. There are communication connections between the different colored optical modules that have communication connections to the different input/output ports of each switch and one multiplexer/demultiplexer, where different switches are communicatively connected to different multiplexers/demultiplexers using colored optical modules. The at least two switches and the hub device form a star network topology structure using the multiplexers/demultiplexers, where the hub device is separately communicatively connected to different multiplexers/demultiplexers using different ports. The switch is configured to receive at least two electrical signals, and separately process each of the at least two electrical signals according to the following processing manner for a first electrical signal determining an input/output port corresponding to a destination address carried in the first electrical signal, and outputting the first electrical signal using the determined input/output port, where the destination address is used to indicate a destination server. The input/output port corresponding to the destination address is an input/output port corresponding to a destination switch that is communicatively connected to the destination server. The destination server is one of the at least two servers. The destination switch is a switch that is communicatively connected to the destination server, and the at least two electrical signals include any one or a combination of electrical signals sent by a server that has a communication connection to the switch, or electrical signals from another switch in the at least two switches. The colored optical module is configured to receive an electrical signal output by an input/output port of a switch that has a communication connection to the colored optical module, and convert the received electrical signal into an optical signal with a specific wavelength, where optical signals obtained through conversion by different colored optical modules that have communication connections to different input/output ports of a switch have different wavelengths, the multiplexer/demultiplexer is configured to receive multiple optical signals sent by each of multiple colored optical modules that have communication connections to the multiplexer/demultiplexer, and perform wavelength division multiplexing on the multiple optical signals to form a combined signal. The hub device is configured to receive the combined signal sent by the multiplexer/demultiplexer, demultiplex the combined signal to obtain multiple optical signals, send each of the multiple optical signals to a port corresponding to a destination switch of the optical signal, output each optical signal from the corresponding port, and perform wavelength division multiplexing on optical signals output from a same port to form a combined signal. The multiplexer/demultiplexer is further configured to receive the combined signal from the hub device, demultiplex the combined signal to obtain multiple optical signals, and separately input the multiple optical signals to colored optical modules corresponding to wavelengths of the optical signals, the colored optical module is further configured to receive an optical signal from the multiplexer/demultiplexer, convert the optical signal into an electrical signal, and output the electrical signal to an input/output port of a switch that has a communication connection to the colored optical module, and the switch is further configured to forward the electrical signal received from the colored optical module to a destination server of the electrical signal.

With reference to the first aspect, in a first possible implementation, the system further includes a software-defined networking (SDN) controller, and there is a communication connection between the SDN controller and each switch in the system, where the switch is further configured to receive at least one electrical signal, and separately process each of the at least one electrical signal according to the following processing manner for a second electrical signal, determining an input/output port corresponding to a destination address carried in the second electrical signal, and sending an overload notification to the SDN controller when the input/output port corresponding to the destination address carried in the second electrical signal is overloaded, when receiving the notification sent by the switch, the SDN controller is configured to select at least one input/output port from input/output ports of the switch that sends the notification except the input/output port corresponding to the destination address in the second electrical signal, and feedback the selected at least one input/output port to the switch that sends the notification, and the switch that is in the at least two switches and that sends the notification to the SDN controller is further configured to output the received at least one electrical signal using the at least one input/output port fed back by the SDN controller.

With reference to the first possible implementation of the first aspect, in a second possible implementation, the at least one input/output port selected by the SDN controller is at least one input/output port whose load is the smallest in the input/output ports of the switch that sends the notification.

With reference to the first possible implementation of the first aspect, in a third possible implementation, the SDN controller selects, according to a load balancing rule, at least one input/output port from the input/output ports of the switch that sends the notification except the input/output port corresponding to the destination address in the second electrical signal.

In the foregoing technical solutions, the SDN controller monitors a topology, a packet loss status, and the like in the data center network system, and the SDN controller schedules a signal according to a load status of each port of each switch in order to ensure load balancing among the ports of each switch, thereby avoiding a problem of congestion on some ports and low signal sending efficiency.

With reference to any one of the first aspect, the first possible implementation, the second possible implementation, or the third possible implementation of the first aspect, in a fourth possible implementation, at least one of the multiple colored optical modules is in a switch that has a communication connection to the colored optical module.

With reference to any one of the first aspect, the first possible implementation, the second possible implementation, the third possible implementation, or the fourth possible implementation of the first aspect, in a fifth possible implementation, the hub device is an arrayed waveguide grating (AWG).

In the foregoing technical solutions, the AWG can transmit received optical signals with different wavelengths to each switch in the data center network system, thereby logically implementing network-wide coverage. In addition, the AWG is an optical device, and performance of an optical device is much better than that of an electrical device. Therefore, the AWG implements interconnection between switches in pair in the data center network system, and can resolve a problem of high network device power consumption and a maintenance difficulty caused by a multi-layer network.

With reference to any one of the first aspect, the first possible implementation, the second possible implementation, the third possible implementation, the fourth possible implementation, or the fifth possible implementation of the first aspect, in a sixth possible implementation, after receiving the at least two electrical signals, the switch is further configured to determine whether an electrical signal to be transmitted to a server that has a communication connection to the switch exists in the at least two electrical signals, and if an electrical signal to be transmitted to a server that has a communication connection to the switch exists in the at least two electrical signals, forward, using an input/output port that is of the switch and that is corresponding to a destination address in the electrical signal, the electrical signal to the destination server that has a communication connection to the switch, or if no electrical signal to be transmitted to a server that has a communication connection to the switch exists in the at least two electrical signals, perform a step of sending, using an input/output port that is of the switch and that is corresponding to a destination address in the electrical signal, the electrical signal to a colored optical module that has a communication connection to the input/output port.

With reference to any one of the first aspect, or the first possible implementation, the second possible implementation, the third possible implementation, the fourth possible implementation, the fifth possible implementation, or the sixth possible implementation of the first aspect, in a seventh possible implementation, when the input/output port corresponding to the destination address is not included in a routing policy included in the switch, the switch in further configured to separately send a broadcast message to all input/output ports of the switch according to the destination address carried in the electrical signal, obtain, using the Transmission Control Protocol (TCP)/Internet Protocol (IP) protocol, an input/output port that feeds back a response message, store a mapping relationship between the input/output port that feeds back the response message and the destination address carried in the electrical signal into the routing policy, and send, using the input/output port that feeds back the response message, the electrical signal to a colored optical module that has a communication connection to the switch.

In the foregoing technical solutions, when the destination address carried in the electrical signal is not included in the routing policy included in the switch, the switch can obtain, using the TCP/IP protocol, the input/output port corresponding to the destination address, thereby ensuring reliable electrical signal transmission, and improving electrical signal transmission efficiency.

According to a second aspect, a signal transmission system is provided, including at least two star network topology structures, each star network topology structure includes one hub device, at least two switches, multiple colored optical modules, at least two multiplexers/demultiplexers, and at least two servers, and there is a communication connection between hub devices in the at least two star network topology structures, where in one of the star network topology structures, there is a communication connection between at least one of the at least two switches and at least one server, and there are communication connections between different input/output ports of each switch and different colored optical modules, there are communication connections between the different colored optical modules that have communication connections to the different input/output ports of each switch and one multiplexer/demultiplexer, where different switches are communicatively connected to different multiplexers/demultiplexers using colored optical modules, and the at least two switches and the hub device form a star network topology structure using the multiplexers/demultiplexers, where the hub device is separately communicatively connected to different multiplexers/demultiplexers using different ports, and between any two of the star network topology structures, the switch in one of the star network topology structures is configured to receive at least two electrical signals, and separately process each of the at least two electrical signals according to the following processing manner for a first electrical signal, determining an input/output port corresponding to a destination address carried in the first electrical signal, and outputting the first electrical signal using the determined input/output port, where the destination address is used to indicate a destination server, the input/output port corresponding to the destination address is an input/output port corresponding to a destination switch that is communicatively connected to the destination server, the destination server is a server in the other star network topology structure, the destination switch is a switch that is communicatively connected to the destination server, and the at least two electrical signals include any one or a combination of electrical signals sent by a server that has a communication connection to the switch, electrical signals sent by another switch that is in the at least two switches and that belongs to a star network topology structure same as that of the switch, and electrical signals from a switch that belongs to a star network topology structure different from that of the switch, the colored optical module is configured to receive an electrical signal output by an input/output port of a switch that has a communication connection to the colored optical module, and convert the received electrical signal into an optical signal with a specific wavelength, where optical signals obtained through conversion by different colored optical modules that have communication connections to different input/output ports of a switch have different wavelengths, the multiplexer/demultiplexer is configured to receive multiple optical signals sent by each of multiple colored optical modules that have communication connections to the multiplexer/demultiplexer, and perform wavelength division multiplexing on the multiple optical signals to form a combined signal, the hub device is configured to receive a combined signal sent by a multiplexer/demultiplexer in a star network topology structure same as that of the hub device, and/or a combined signal sent by a hub device in a star network topology structure different from that of the hub device, demultiplex the combined signal to obtain multiple optical signals, send each of the multiple optical signals to a port corresponding to a destination switch of the optical signal, output each optical signal from the corresponding port, and perform wavelength division multiplexing on optical signals output from a same port to form a combined signal, where a destination switch of at least one of the obtained multiple optical signals is in another star network topology structure, and an optical signal of the destination switch in the other star network topology structure is output using a port of the hub device, and transmitted to another hub device, the multiplexer/demultiplexer is further configured to receive a combined signal from a hub device that has a communication connection to the multiplexer/demultiplexer, demultiplex the combined signal to obtain multiple optical signals, and separately input the multiple optical signals to colored optical modules corresponding to wavelengths of the optical signals, the colored optical module is further configured to receive an optical signal from the multiplexer/demultiplexer that has a communication connection to the colored optical module, convert the optical signal into an electrical signal, and output the electrical signal to an input/output port of a switch that has a communication connection to the colored optical module, and the switch is further configured to forward the electrical signal received from the colored optical module that has a communication connection to the switch to a destination server of the electrical signal.

With reference to the second aspect, in a first possible implementation, the system further includes an SDN controller, and there is a communication connection between the SDN controller and each switch in the system, where the switch is further configured to receive at least one electrical signal, and separately process each of the at least one electrical signal according to the following processing manner for a second electrical signal, determining an input/output port corresponding to a destination address carried in the second electrical signal, and sending an overload notification to the SDN controller when the input/output port corresponding to the destination address carried in the second electrical signal is overloaded, when receiving the notification sent by the switch, the SDN controller is configured to select at least one input/output port from input/output ports of the switch that sends the notification except the input/output port corresponding to the destination address in the second electrical signal, and feedback the selected at least one input/output port to the switch that sends the notification, and the switch that is in the at least two switches and that sends the notification to the SDN controller is further configured to output the received at least one electrical signal using the at least one input/output port fed back by the SDN controller.

With reference to the second aspect, or the first possible implementation of the second aspect, in a second possible implementation, the at least one input/output port selected by the SDN controller is at least one input/output port whose load is the smallest in the input/output ports of the switch that sends the notification.

With reference to any one of the second aspect, the first possible implementation, or the second possible implementation of the second aspect, in a third possible implementation, the SDN controller selects, according to a load balancing rule, at least one input/output port from the input/output ports of the switch that sends the notification except the input/output port corresponding to the destination address in the second electrical signal.

In the foregoing technical solutions, the SDN controller monitors a topology, a packet loss status, and the like in the data center network system, and the SDN controller schedules a signal according to a load status of each port of each switch in order to ensure load balancing among the ports of each switch, thereby avoiding a problem of congestion on some ports and low signal sending efficiency.

With reference to any one of the second aspect, the first possible implementation, the second possible implementation, or the third possible implementation of the second aspect, in a fourth possible implementation, the system further includes an extension-arm switch, and the hub device is communicatively connected to at least one other hub device using the extension-arm switch.

With reference to any one of the second aspect, the first possible implementation, the second possible implementation, the third possible implementation, or the fourth possible implementation of the second aspect, in a fifth possible implementation, when the input/output port corresponding to the destination address is not included in a routing policy included in the switch, the switch in further configured to separately send a broadcast message to all input/output ports of the switch according to the destination address carried in the electrical signal, obtain, using the TCP/IP protocol, an input/output port that feeds back a response message, store a mapping relationship between the input/output port that feeds back the response message and the destination address carried in the electrical signal into the routing policy, and send, using the input/output port that feeds back the response message, the electrical signal to a colored optical module that has a communication connection to the switch.

In the foregoing technical solutions, when the destination address carried in the electrical signal is not included in the routing policy included in the switch, the switch can obtain, using the TCP/IP protocol, the input/output port corresponding to the destination address, thereby ensuring reliable electrical signal transmission, and improving electrical signal transmission efficiency.

In the embodiments of the present disclosure, the data center network system uses the star network topology structure. A hub device is used as a center of the star network topology structure. There are communication connections between each hub device and at least two switches. In each star network topology structure, there is a communication connection between at least one of at least two switches and at least one server. In the technical solutions in the present disclosure, each switch has a hub device that has a communication connection to the switch. The hub device and the switch form a star network topology structure. Compared with a mesh network topology structure, in the star network topology structure, a physical connection channel does not need to be established between all switch devices, and a smaller quantity of cables are laid out between devices such that a quantity of network layout cables can be effectively reduced, and subsequent network maintenance workload can be reduced. In addition, in a current three-layer network architecture, all signals sent from a source server to a destination server need to be forwarded by an aggregation layer device and a core layer device. By comparison, a signal output by the source server in the data center network system in the embodiments of the present disclosure successively passes through the source switch that has a communication connection to the source server, the hub device, and the destination switch that has a communication connection to the destination server in order to arrive at the destination server, and all signals are forwarded only by the hub device. Compared with the three-layer network architecture, a signal is forwarded at a smaller quantity of layers, and therefore this helps implement network structure delayering in the data center network system, thereby reducing energy consumption caused by a core layer device and an aggregation layer device, and effectively reducing system energy consumption and device maintenance costs. In addition, the data center network system further includes a colored optical module. The colored optical module converts an electrical signal sent by a server to a switch into an optical signal such that only an optical signal is transmitted between the hub device and the colored optical module. Because an optical signal has advantages of high transmission reliability, a high transmission speed, and a large transmission data amount, a larger data amount can be carried in the data center network system in the embodiments of the present disclosure, and signal transmission reliability and transmission efficiency are improved.

BRIEF DESCRIPTION OF DRAWINGS

FIG. 9 is a flowchart of signal transmission in a data center network system according to Embodiment 3 of the present disclosure;

DESCRIPTION OF EMBODIMENTS

In embodiments of the present disclosure, a star network topology structure is used in a data center network system to resolve a problem of a large quantity of layout cables and a maintenance difficulty in a conventional data center network. A hub device is used as a center of the star network topology structure. Each hub device has a communication connection to at least two switches. In each star network topology structure, at least one of at least two switches has a communication connection to at least one server. In technical solutions in the present disclosure, each switch has a hub device that has a communication connection to the switch. The hub device and the switch form a star network topology structure. Compared with a mesh network topology structure, in the star network topology structure, a physical connection channel does not need to be established between all switch devices, and a smaller quantity of cables are laid out between devices such that a quantity of network layout cables can be effectively reduced, and subsequent network maintenance workload can be reduced. In addition, in a current three-layer network architecture, all signals sent from a source server to a destination server need to be forwarded by an aggregation layer device and a core layer device. By comparison, a signal output by a source server in the data center network system in the embodiments of the present disclosure successively passes through a source switch that has a communication connection to the source server, a hub device, and a destination switch that has a communication connection to a destination server in order to arrive at the destination server, and all signals are forwarded only by the hub device. Compared with the three-layer network architecture, a signal is forwarded at a smaller quantity of layers, and therefore this helps implement network structure delayering in the data center network system, thereby reducing energy consumption caused by a core layer device and an aggregation layer device, and effectively reducing system energy consumption and device maintenance costs. In addition, the data center network system further includes a colored optical module. The colored optical module converts an electrical signal sent by a server to a switch into an optical signal such that only an optical signal is transmitted between the hub device and the colored optical module. Because an optical signal has advantages of high transmission reliability, a high transmission speed, and a large transmission data amount, a larger data amount can be carried in the data center network system in the embodiments of the present disclosure, and signal transmission reliability and transmission efficiency are improved.

The following describes further implementations of the present disclosure with reference to accompanying drawings.

Embodiment 1

Figure 1:
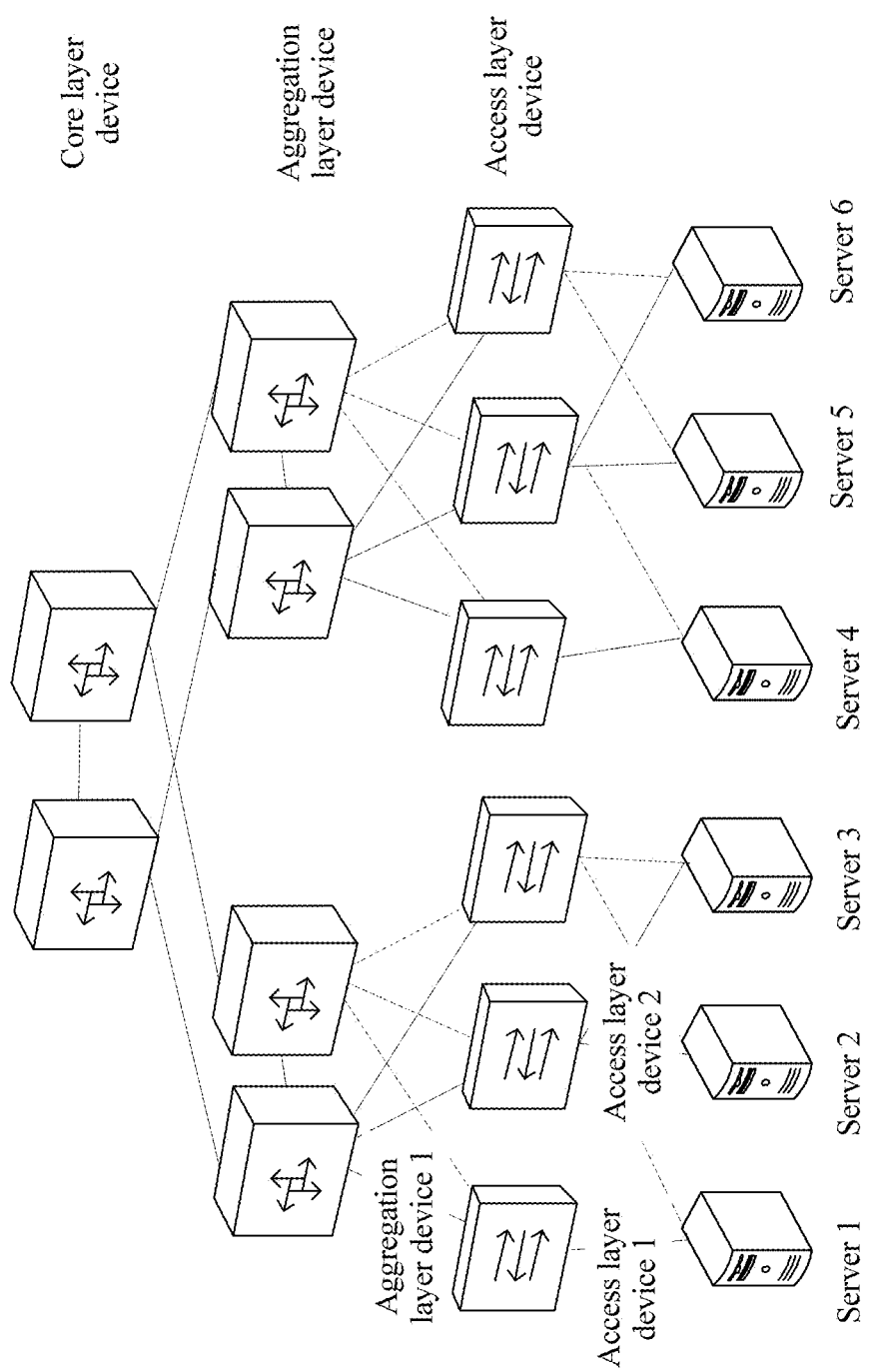
FIG. 1 is a schematic structural diagram of a data center network.
Figure 2A:
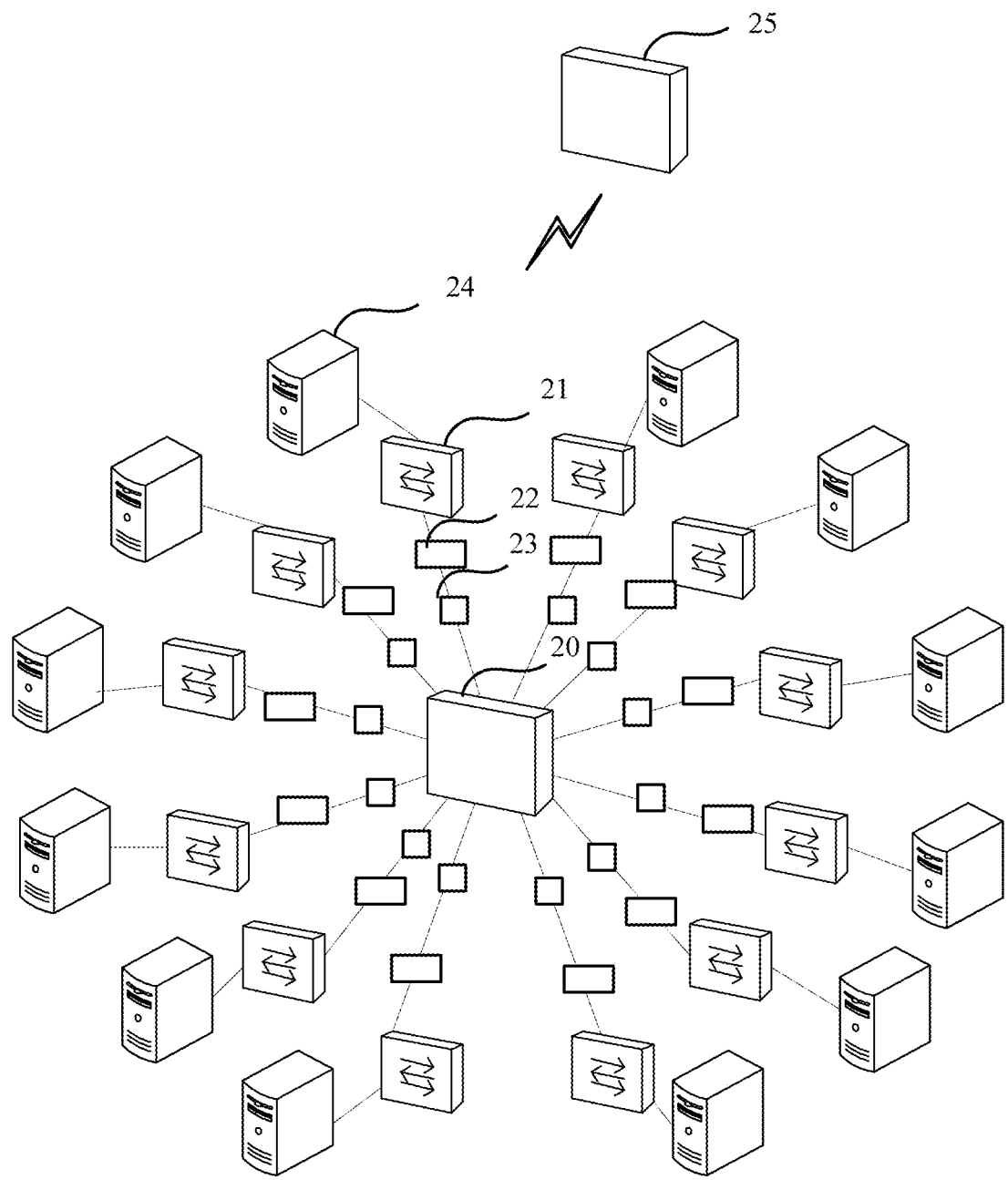
FIG. 2A is a schematic structural diagram of a physical connection in a data center network system according to Embodiment 1 of the present disclosure.

Referring to FIG. 2A, FIG. 2A is a schematic diagram of an architecture of a data center network system according to an embodiment of the present disclosure. The data center network system includes a hub device 20, at least two switches 21, multiple colored optical modules 22, at least two multiplexers/demultiplexers 23, and at least two servers 24.

There is a communication connection between at least one of the at least two switches 21 and at least one server 24, and there are communication connections between different input/output ports of each switch 21 and different colored optical modules 22.

There are communication connections between the different colored optical modules 22 that have communication connections to the different input/output ports of each switch 21 and one multiplexer/demultiplexer 23, where switches 21 are communicatively connected to different multiplexers/demultiplexers 23 using colored optical modules 22.

The at least two switches 21 and the hub device 20 form a star network topology structure using the multiplexers/demultiplexers 23, where the hub device 20 is separately communicatively connected to different multiplexers/demultiplexers 23 using different ports.

The switch 21 is configured to receive at least two electrical signals, and separately process each of the at least two electrical signals according to the following processing manner for a first electrical signal, determining an input/output port corresponding to a destination address carried in the first electrical signal, and outputting the first electrical signal using the determined input/output port, where the destination address is used to indicate a destination server, the input/output port corresponding to the destination address is an input/output port corresponding to a destination switch that is communicatively connected to the destination server, the destination server is one of the at least two servers 24, the destination switch is a switch that is communicatively connected to the destination server, and the at least two electrical signals include any one or a combination of electrical signals sent by a server 24 that has a communication connection to the switch, or electrical signals from another switch in the at least two switches 21.

The colored optical module 22 is configured to receive an electrical signal output by an input/output port of the switch 21 that has a communication connection to the colored optical module 22, and convert the received electrical signal into an optical signal with a specific wavelength, where optical signals obtained through conversion by different colored optical modules 22 that have communication connections to different input/output ports of a switch 21 have different wavelengths.

The multiplexer/demultiplexer 23 is configured to receive multiple optical signals sent by each of multiple colored optical modules 22 that have communication connections to the multiplexer/demultiplexer 23, and perform wavelength division multiplexing on the multiple optical signals to form a combined signal.

The hub device 20 is configured to receive the combined signal sent by the multiplexer/demultiplexer 23, demultiplex the combined signal to obtain multiple optical signals, send each of the multiple optical signals to a port corresponding to a destination switch of the optical signal, output each optical signal from the corresponding port, and perform wavelength division multiplexing on optical signals output from a same port to form a combined signal.

The multiplexer/demultiplexer 23 is further configured to receive the combined signal from the hub device 20, demultiplex the combined signal to obtain multiple optical signals, and separately input the multiple optical signals to colored optical modules 22 corresponding to wavelengths of the optical signals.

The colored optical module 22 is further configured to receive an optical signal from the multiplexer/demultiplexer 23, convert the optical signal into an electrical signal, and output the electrical signal to an input/output port of a switch 21 that has a communication connection to the colored optical module 22.

The switch 21 is further configured to forward the electrical signal received from the colored optical module 22 to a destination server of the electrical signal.

Further, the data center network system further includes an SDN controller 25, and there is a communication connection between the SDN controller 25 and each switch 21 in the system.

The switch 21 is further configured to receive at least one electrical signal, and separately process each of the at least one electrical signal according to the following processing manner for a second electrical signal, determining an input/output port corresponding to a destination address carried in the second electrical signal, and sending an overload notification to the SDN controller 25 when the input/output port corresponding to the destination address carried in the second electrical signal is overloaded.

When receiving the notification sent by the switch 21, the SDN controller 25 is configured to select at least one input/output port from input/output ports of the switch 21 that sends the notification except the input/output port corresponding to the destination address in the second electrical signal, and feedback the selected at least one input/output port to the switch 21 that sends the notification.

The switch that is in the at least two switches 21 and that sends the notification to the SDN controller 25 is further configured to output the received at least one electrical signal using the at least one input/output port fed back by the SDN controller 25.

Optionally, the at least one input/output port selected by the SDN controller 25 is at least one input/output port whose load is the smallest in the input/output ports of the switch 21 that sends the notification.

Optionally, the SDN controller 25 selects, according to a load balancing rule, at least one input/output port from the input/output ports of the switch that sends the notification except the input/output port corresponding to the destination address in the second electrical signal.

In the foregoing technical solutions, the SDN controller 25 monitors a topology, a packet loss status, and the like in the data center network system, and the SDN controller 25 schedules a signal according to a load status of each port of each switch 21 in order to ensure load balancing among the ports of each switch 21, thereby avoiding a problem of congestion on some ports and low signal sending efficiency.

Optionally, at least one of the multiple colored optical modules 22 is in a switch 21 that has a communication connection to the colored optical module 22.

Optionally, the multiplexer/demultiplexer 23 is in a switch 21 that has a communication connection to the multiplexer/demultiplexer 23.

Optionally, a communication connection between the server 24 and the switch 21 is established in a wireless manner, or a communication connection between the server 24 and the switch 21 is established using a wired cable, a communication connection between the switch 21 and the colored optical module 22 is established in a wireless manner, or a communication connection between the switch 21 and the colored optical module 22 is established using a wired cable, a communication connection between the colored optical module 22 and the multiplexer/demultiplexer 23 is established in a wireless manner, or a communication connection between the colored optical module 22 and the multiplexer/demultiplexer 23 is established using an optical fiber, and a communication connection between the multiplexer/demultiplexer 23 and the hub device 20 is established in a wireless manner, or a communication connection between the multiplexer/demultiplexer 23 and the hub device 20 is established using one optical fiber.

Optionally, the hub device 20 is an AWG.

Figure 2B:
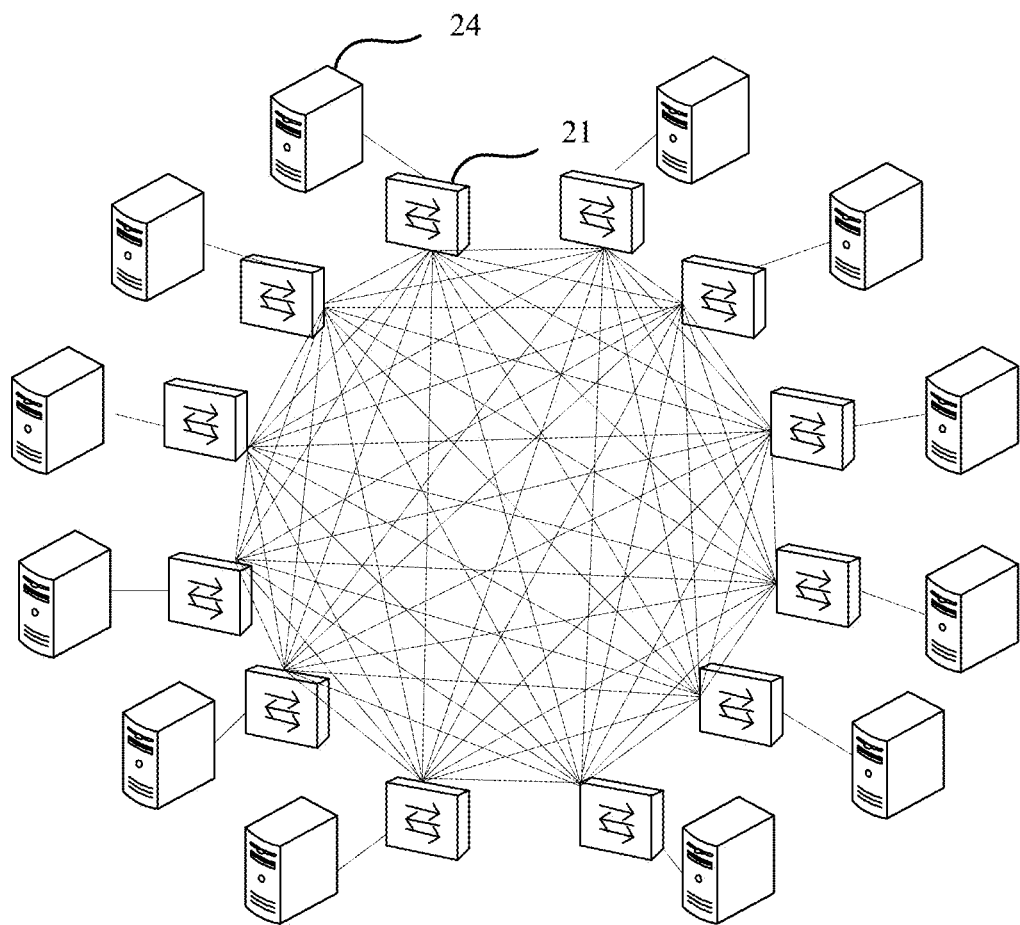
FIG. 2B is a schematic structural diagram of a logical connection in the data center network system according to Embodiment 1 of the present disclosure.

When the hub device 20 is an AWG, based on an optical demultiplexing feature of the AWG, a schematic structural diagram of a logical connection shown in FIG. 2B may be constructed by the data center network system in this embodiment of the present disclosure. A mesh connection can be logically implemented in the data center network system.

Embodiment 2

Based on the data center network system described in Embodiment 1, for ease of description, a transmission process of multiple signals in this embodiment of the present disclosure is described in detail below using an example in which a data center network system includes a source server, a source switch, a hub device, a destination switch, and a destination server, there are communication connections between the source server and multiple colored optical modules, there are communication connections between all the colored optical modules and one multiplexer/demultiplexer (referred to as a source multiplexer/demultiplexer below), there are communication connections between the destination server and multiple colored optical modules, there are communication connections between all the colored optical modules and one multiplexer/demultiplexer (referred to as a destination multiplexer/demultiplexer below), there is a communication connection between the source server and the source switch, there is a communication connection between the destination server and the destination switch, and both the source multiplexer/demultiplexer and the destination multiplexer/demultiplexer are connected to the hub device using one optical fiber.

The source server and the destination server are relative concepts. That is, a server that generates a signal is the source server, and a server that receives the signal is the destination server. Any server may be the source server, or may be the destination server. For example, a server A sends a signal to a server B, in a transmission process of the signal a, the server A is the source server, and the server B is the destination server. For another example, a server A receives a signal b sent by a server B, in a transmission process of the signal b, the server A is the destination server, and the server B is the source server.

Figure 3:
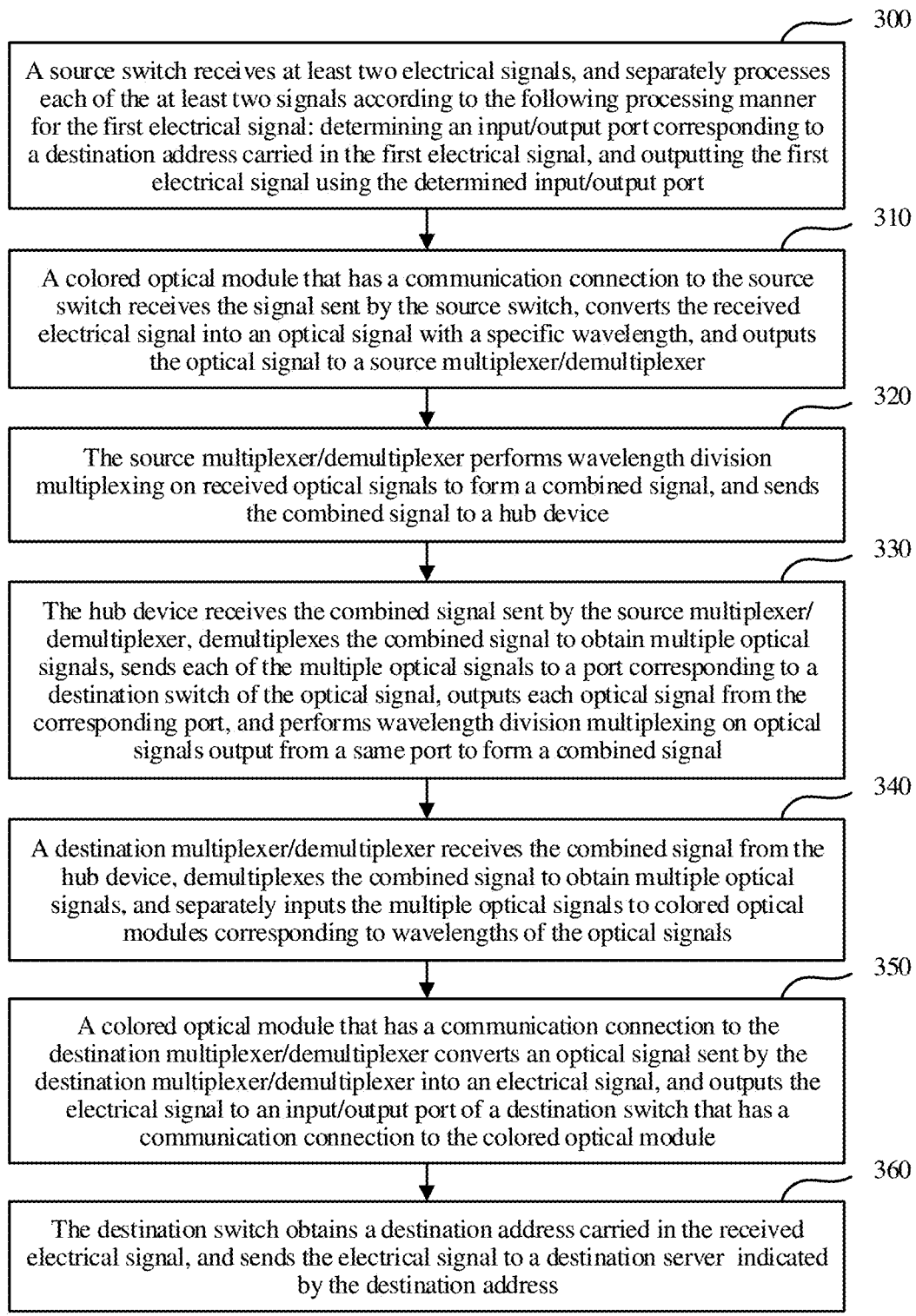
FIG. 3 is a flowchart of signal transmission in a data center network system according to Embodiment 2 of the present disclosure.

Referring to FIG. 3, a signal transmission process in the data center network system in this embodiment of the present disclosure includes the following steps.

Step 300: A source switch receives at least two electrical signals, and separately processes each of the at least two electrical signals according to the following processing manner for a first electrical signal: determining an input/output port corresponding to a destination address carried in the first electrical signal, and outputting the first electrical signal using the determined input/output port.

Figure 4:
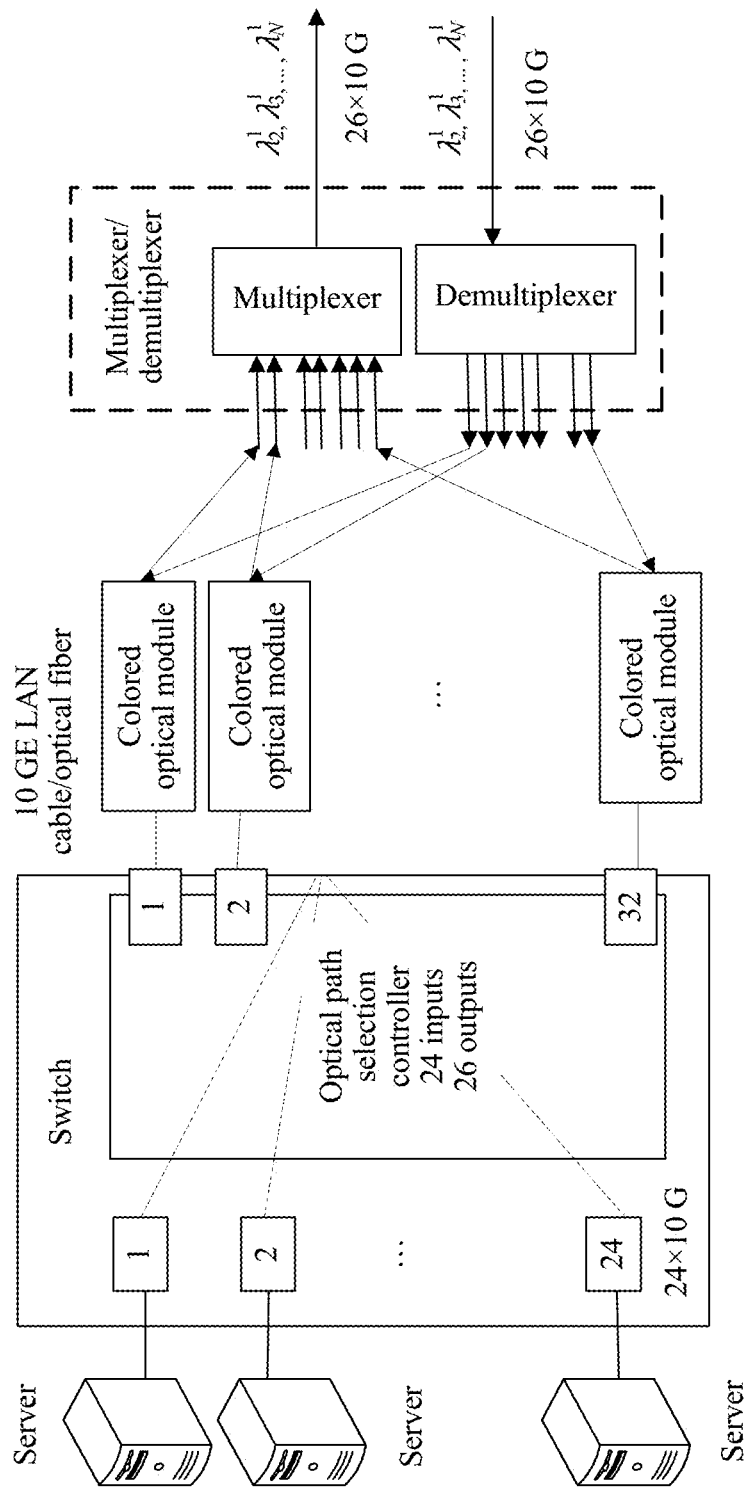
FIG. 4 is a schematic structural diagram of a switch according to Embodiment 2 of the present disclosure.

Referring to FIG. 4, FIG. 4 is a schematic structural diagram of a switch according to this embodiment of the present disclosure. One end of the source switch includes multiple downstream ports. Each of the downstream ports is connected to a different source server. The other end includes multiple input/output ports. Each of the input/output ports is connected to a different colored optical module.

In this embodiment of the present disclosure, the at least two electrical signals received by the source switch include any one or a combination of electrical signals sent by a source server that has a communication connection to the source switch, or electrical signals from another switch.

The at least two electrical signals sent by the source server that has a communication connection to the source switch include the following case. There is one source server, and the source server generates, according to a service requirement, at least two electrical signals that are sent to at least two destination servers. For example, the source server generates two electrical signals, an electrical signal 1 and an electrical signal 2. A destination server corresponding to the electrical signal 1 is a server 1, and a destination server corresponding to the electrical signal 2 is a server 2. The electrical signal 1 and the electrical signal 2 correspond to different destination servers. The source switch receives the signal 1 and the signal 2 sent by the source server. Alternatively, the at least two electrical signals sent by the source server that has a communication connection to the source switch include the following case. There are multiple source servers. Each source server generates, according to a service requirement, at least one of electrical signals that is sent to a destination server. For example, a source server A generates an electrical signal 1, and a source server B generates an electrical signal 2. The electrical signal 1 and the electrical signal 2 may be corresponding to a same destination server or different destination servers. The source switch receives the signal 1 and the signal 2.

Optionally, a signal sent by the source server may be an optical signal, or may be an electrical signal. If the signal sent by the source server is an optical signal, because the switch is incapable of processing an optical signal, an optical-to-electrical conversion apparatus further needs to be disposed between the source server and the source switch, or in the source switch. There is a communication connection between the optical-to-electrical conversion apparatus and the source server and between the optical-to-electrical conversion apparatus and the source switch in order to convert an optical signal sent by the source server into an electrical signal, and send the electrical signal obtained through conversion to the source switch.

The source switch is a Top of Rack (TOR), and the source switch is an Ethernet switch having three-layer functions. A downstream port of the source switch may be implemented using an SFP+/XFP 10 GE optical-to-electrical conversion port. The 10 GE optical-to-electrical conversion port includes a 10 GE LAN optical module. The 10 GE LAN optical module outputs an 850-nanometer multimode optical signal. An input/output port of the source switch may include a 10 GE LAN optical module or a 10 GE LAN electrical module.

In addition, a quantity of input/output ports of the source switch is related to a quantity of switches in the data center network system and interconnection bandwidth in a specific application scenario. That is, a larger quantity of switches in the data center network system indicates a larger quantity of input/output ports, and wider interconnection bandwidth indicates a larger quantity of input/output ports. For example, there are N TORs and M extension-arm switches in the data center network system, n 10 gigabit (Gb) links are deployed between any two TORs, and m 10 Gb links are deployed between a TOR and an extension-arm switch, and in this case, a quantity of input/output ports of each TOR is n(N−1)+mM. For example, there are 24 TORs in total and three extension-arm switches, one 10 Gb link is used between any TOR and another TOR, and between any TOR and an extension-arm switch, and in this case, a quantity of input/output ports is 26(1*(24−1)+1*3=26).

Optionally, the source switch includes a routing policy. The routing policy includes a mapping relationship between an input/output port and a destination address. When receiving an electrical signal sent by the source server, the source switch obtains a destination address carried in the electrical signal, selects, from the routing policy, an input/output port that has a mapping relationship with the obtained destination address segment, and sends the electrical signal to the selected input/output port. The routing policy is pre-configured according to network deployment during creating of the data center network system.

Optionally, referring to FIG. 4, an optical path selection controller may be included in the source switch. The optical path selection controller outputs, according to the routing policy, a received electrical signal to an input/output port that is in all input/output ports of the source switch and that is corresponding to a destination address carried in the electrical signal.

Further, after receiving the at least two electrical signals, the source switch further needs to determine whether an electrical signal to be transmitted to a server that has a communication connection to the source switch exists in the at least two electrical signals, and if an electrical signal to be transmitted to a server that has a communication connection to the source switch exists in the at least two electrical signals, directly forwards, using an input/output port that is of the source switch and that is corresponding to a destination address carried in the electrical signal, the electrical signal to the destination server that has a communication connection to the source switch, or otherwise, performs a step of sending, using an input/output port selected according to the routing policy, the electrical signal to a colored optical module that has a communication connection to the selected input/output port.

Further, when the input/output port corresponding to the destination address is not included in the routing policy included in the source switch, the source switch separately sends a broadcast message to all input/output ports according to the destination address carried in the electrical signal, obtains, using the TCP/IP protocol, an input/output port that feeds back a response message, and stores a mapping relationship between the input/output port that feeds back the response message and the destination address carried in the electrical signal into the routing policy. In addition, the source switch sends, using the input/output port that feeds back the response message, the electrical signal to a colored optical module that has a communication connection to the source switch.

In the foregoing technical solutions, when the destination address carried in the electrical signal is not included in the routing policy included in the source switch, the source server can obtain the input/output port corresponding to the destination address using the TCP/IP protocol, thereby ensuring reliable electrical signal transmission, and improving electrical signal transmission efficiency.

Step 310: A colored optical module that has a communication connection to the source switch receives the signal sent by the source switch, converts the received electrical signal into an optical signal with a specific wavelength, and outputs the optical signal to a source multiplexer/demultiplexer.

In this embodiment of the present disclosure, referring to FIG. 4, each input/output port of the source switch is connected to one colored optical module. Each colored optical module can convert a received electrical signal into an optical signal with a different wavelength. A wavelength of an optical signal that can be processed by each colored optical module is pre-configured according to network deployment during creating of the data center network system.

Optionally, the colored optical module is a 10 GE colored optical module. The 10 GE colored optical module outputs a 1310-nanometer or a 1550-nanometer single-mode optical signal.

In the foregoing technical solutions, the source switch separately sends electrical signals that include different destination addresses to different input/output ports. Because optical signals that can be processed by colored optical modules connected to all the input/output ports have different wavelengths, multiple electrical signals are converted into optical signals with different wavelengths, and different optical signals are differentiated according to wavelengths such that a hub device subsequently identifies, according to the wavelengths of the optical signals, destination switches to which the optical signals are sent.

Step 320: The source multiplexer/demultiplexer performs wavelength division multiplexing on received optical signals to form a combined signal, and sends the combined signal to a hub device.

In this embodiment of the present disclosure, the source multiplexer/demultiplexer has a wavelength division multiplexing function, and a wavelength division demultiplexing function. The source multiplexer/demultiplexer can receive optical signals generated by all colored optical modules that have communication connections to the source multiplexer/demultiplexer, physically multiplex the received optical signals to form one combined signal, and output the combined signal to a colored optical port. The combined signal includes the optical signals that are with various wavelengths and that are sent by the colored optical modules. The source multiplexer/demultiplexer transmits the combined signal to the hub device using one optical fiber between the source multiplexer/demultiplexer and the hub device.

In the foregoing technical solutions, multiple electrical signals sent by the switch are converted into optical signals, and the optical signals obtained through conversion are transmitted to the hub device using one optical fiber, thereby ensuring reliability of the electrical signals transmitted by the switch. In addition, because an optical fiber features a large capacity, a quantity of signals to be transmitted between the switch and the hub device can be met using only one optical fiber. Therefore, compared with transmitting a signal using a cable, transmitting an electrical signal using an optical fiber can effectively reduce a quantity of layout cables in the data center network system.

Step 330: The hub device receives the combined signal sent by the source multiplexer/demultiplexer, demultiplexes the combined signal to obtain multiple optical signals, sends each of the multiple optical signals to a port corresponding to a destination switch of the optical signal, outputs each optical signal from the corresponding port, and performs wavelength division multiplexing on optical signals output from a same port to form a combined signal.

In this embodiment of the present disclosure, the hub device receives, using a port of the hub device, the combined signal sent by the source multiplexer/demultiplexer using the colored optical port. Each port of the hub device includes a preset mapping relationship, and the mapping relationship includes a correspondence between each wavelength and the port. Mapping relationships included in all ports in the hub device are different. The mapping relationship is pre-configured according to network deployment during creating of the data center network system. The hub device demultiplexes the combined signal to obtain multiple optical signals. For each optical signal, the hub device performs the following operations of searching, according to a wavelength of the optical signal, for a mapping relationship included in the port, searching the mapping relationship for a port corresponding to the wavelength of the optical signal, transmitting the optical signal to the found port, and sending the optical signal using the found port. When there are multiple optical signals on the found port, the hub device first performs wavelength division multiplexing on all the optical signals included on the found port to generate one combined signal, and then sends the combined signal.

Figure 5:
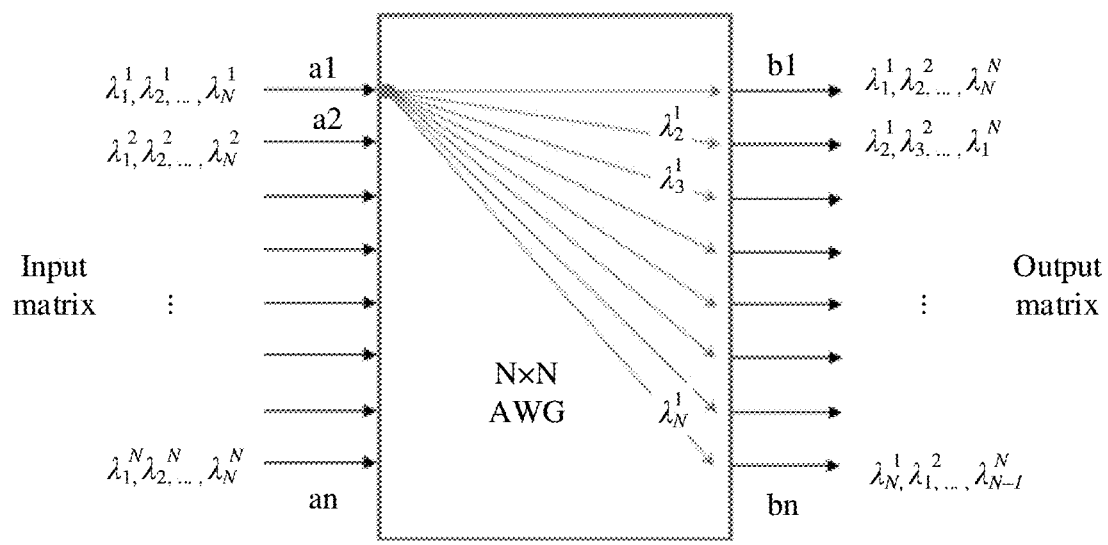
FIG. 5 is a schematic diagram of AWG demultiplexing according to an embodiment of the present disclosure.

Referring to FIG. 5, FIG. 5 is a schematic structural diagram in which when the hub device is an AWG, the AWG searches for a corresponding port for each optical signal according to wavelengths of different optical signals. For optical signals that are with multiple wavelengths and that are sent by the source switch, the AWG uses the wavelengths of all the optical signals input by the source switch as an input matrix (including one row and N columns, where each element in the matrix is a wavelength of one optical signal).

Referring to FIG. 5, for a port a1 of the AWG, after the port a1 receives multiple optical signals, a transposed matrix (including N rows and one column, where each element in the transposed matrix is a wavelength of one optical signal) of the input matrix is generated after the AWG performs demultiplexing processing on the optical signals on the port. The transposed matrix is an output matrix of the port a1. Each element in the output matrix corresponds to one port (b1 to bn). For a port a2 of the AWG, after the port a2 receives multiple optical signals, a transposed matrix of the input matrix is generated after the AWG performs demultiplexing processing on the optical signals on the port, and elements in the transposed matrix are cyclically shifted down by 1 bit to generate an output matrix. Each element in the output matrix corresponds to one port (b1 to bn). By analogy, for a port an of the AWG, after the port an receives multiple optical signals, a transposed matrix of the input matrix is generated after the AWG performs demultiplexing processing on the optical signals on the port, and elements in the transposed matrix are cyclically shifted down by (n−1) bits to generate an output matrix. Each element in the output matrix corresponds to one port (b1 to bn). The ports a1 to an and b1 to bn may be input ports that receive optical signals sent by the switch, or may be output ports that send optical signals to the switch.

In the foregoing technical solutions, the AWG can transmit received optical signals with different wavelengths to each switch in the data center network system, thereby logically implementing network-wide coverage. In addition, the AWG is an optical device, and performance of an optical device is much better than that of an electrical device. Therefore, the AWG implements interconnection between switches in pair in the data center network system, and can resolve a problem of high network device power consumption and a maintenance difficulty caused by a multi-layer network.

Step 340: A destination multiplexer/demultiplexer receives the combined signal from the hub device, demultiplex the combined signal to obtain multiple optical signals, and separately inputs the multiple optical signals to colored optical modules corresponding to wavelengths of the optical signals.

In this embodiment of the present disclosure, the destination multiplexer/demultiplexer receives, using one optical fiber between the destination multiplexer/demultiplexer and the hub device, the combined signal sent by the hub device, and performs demultiplexing processing on the combined signal to obtain multiple optical signals. For each obtained optical signal, the destination multiplexer/demultiplexer performs the following operations. A mapping relationship between a wavelength and a colored optical module is included in the destination multiplexer/demultiplexer, and the destination multiplexer/demultiplexer searches the mapping relationship stored in the destination multiplexer/demultiplexer for a colored optical module that has a mapping relationship with a wavelength of the optical signal, and sends the optical signal to the found colored optical module.

In the foregoing technical solutions, the multiplexer/demultiplexer receives, using one optical fiber, the combined signal that includes multiple signals and that is sent by the hub device. Compared with transmitting a signal using a cable, transmitting an electrical signal using an optical fiber can effectively reduce a quantity of layout cables in the data center network system.

Optionally, the destination multiplexer/demultiplexer may send optical signals to multiple colored optical modules at the same time. For example, after demultiplexing the combined signal, the destination multiplexer/demultiplexer obtains a signal 1, a signal 2, and a signal 3. A wavelength of the signal 1 is a wavelength 1, a wavelength of the signal 2 is a wavelength 2, and a wavelength of the signal 3 is a wavelength 3. In this case, the destination multiplexer/demultiplexer determines, according to the mapping relationship stored in the destination multiplexer/demultiplexer, that a colored optical module corresponding to the wavelength 1 is a colored optical module 2, a colored optical module corresponding to the wavelength 2 is a colored optical module 3, and a colored optical module corresponding to the wavelength 3 is a colored optical module 1. Based on this, the destination multiplexer/demultiplexer sends the signal 1 to the colored optical module 2, sends the signal 2 to the colored optical module 3, and sends the signal 3 to the colored optical module 1.

Step 350: A colored optical module that has a communication connection to the destination multiplexer/demultiplexer converts an optical signal sent by the destination multiplexer/demultiplexer into an electrical signal, and outputs the electrical signal to an input/output port of a destination switch that has a communication connection to the colored optical module.

In this embodiment of the present disclosure, after receiving an optical signal sent by the destination multiplexer/demultiplexer, each colored optical module that has a communication connection to the destination multiplexer/demultiplexer performs the following operations of converting the optical signal into an electrical signal, and transmitting the electrical signal to an input/output port of a destination switch that has a communication connection to the colored optical module.

Optionally, the colored optical module is a 10 GE colored optical module. The 10 GE colored optical module outputs a 1310-nanometer or a 1550-nanometer single-mode optical signal.

Step 360: The destination switch obtains a destination address carried in the received electrical signal, and sends the electrical signal to a destination server indicated by the destination address.

In this embodiment of the present disclosure, referring to FIG. 4, one end of the destination switch includes multiple downstream ports. Each of the downstream ports is connected to a different destination server. The other end includes multiple input/output ports. Each of the input/output ports is connected to a different colored optical module.

Because the electrical signal carries a destination address, after receiving, from an input/output port, an electrical signal sent by a colored optical module, the destination switch can determine, according to a destination address carried in the electrical signal, a downstream port connected to a destination server indicated by the destination address. The destination switch transmits the electrical signal to the corresponding destination server using the determined downstream port.

Optionally, a signal that can be received by the destination server is an optical signal, or may be an electrical signal. If a signal received by the destination server is an optical signal, because a conventional switch is incapable of processing an optical signal, an optical-to-electrical conversion apparatus further needs to be disposed between the destination server and the destination switch, or in the destination switch. There is a communication connection between the optical-to-electrical conversion apparatus and the destination server and between the optical-to-electrical conversion apparatus and the destination switch in order to convert an electrical signal sent by the destination switch into an optical signal, and send the optical signal obtained through conversion to the destination server. The downstream port of the destination switch is the same as the downstream port of the source switch. A method for determining a quantity of input/output ports of the destination switch is the same as the method for determining a quantity of input/output ports of the source switch, and an internal structure of the destination switch is the same as an internal structure of the source switch. Details are not described herein again.

In a specific application scenario, referring to FIG. 4, the source switch is a conventional Ethernet switch, and the source server is connected to the source switch using a conventional Ethernet technology. The source switch completes electrical cross-connection conversion from 24 inputs to 26 outputs according to the routing policy stored in the source switch. The source switch includes 24 downstream ports connected to source servers, and 26 input/output ports connected to colored optical modules. Ports obtained by the input/output ports minus the ports used by the source switch to connect to the source servers may be connected to an extension-arm switch. The colored optical modules complete converting electrical signals output by the 26 input/output ports into optical signals. The multiplexer/demultiplexer completes a process of modulating wavelengths of the optical signals, aggregates combined signals obtained after wavelength modulation to the source multiplexer/demultiplexer, multiplexes the combined signals to one optical fiber, and outputs the combined signals to a port of the hub device. Correspondingly, after receiving the combined signal (the combined signal includes optical signals with multiple wavelengths) sent by the hub device, the destination multiplexer/demultiplexer demultiplexes the combined signal to generate optical signals with different wavelengths, and outputs, according to a wavelength of each optical signal, the optical signal to a colored optical module that can process the optical signal with this wavelength. Different colored optical modules convert the optical signals into electrical signals, and output the electrical signals to the destination switch. The destination switch transmits the electrical signals to corresponding destination servers according to destination addresses carried in the electrical signals.

Figure 6:
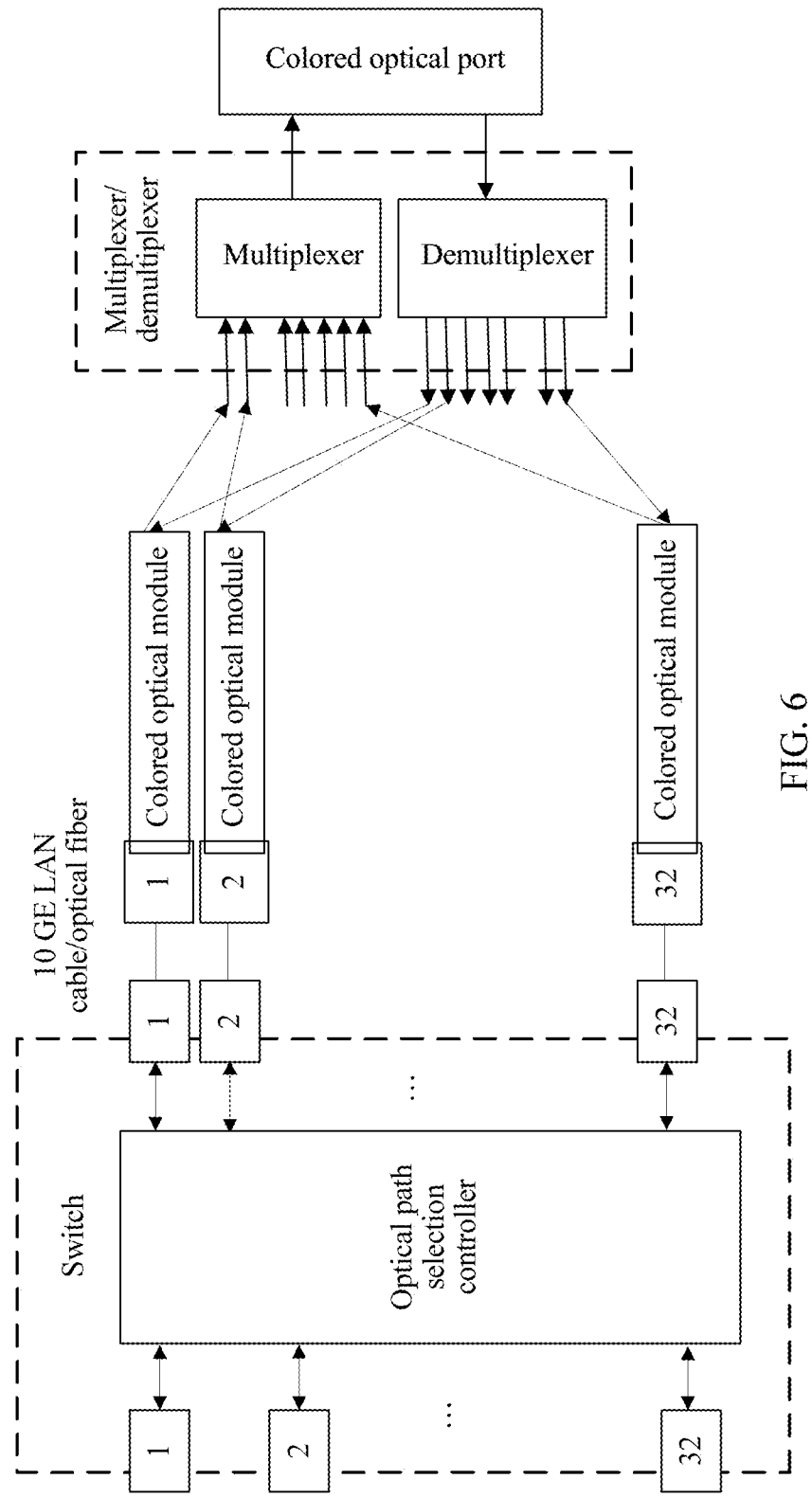
FIG. 6 is a schematic structural diagram of another switch according to Embodiment 2 of the present disclosure.

In another application scenario, referring to FIG. 6, both the source switch and the destination switch are conventional Ethernet switches. The source server is connected to the source switch using a conventional Ethernet technology. The source switch completes electrical cross-connection conversion from 64 inputs to 64 outputs according to the routing policy stored in the source switch. The source switch includes 64 downstream ports connected to source servers, and 64 input/output ports connected to colored optical modules. In this application scenario, a signal transmission process is similar to that in the application scenario shown in FIG. 4. Details are not described herein.

In this embodiment of the present disclosure, a star network topology structure in which one hub device is used as a center forms one CELL. The CELL may be equivalent to a concept in an actual service, such as a service partition, a delivery unit, or a system cluster. In an actual application scenario, a network system may include multiple CELLs, and the CELLs are connected using an extension-arm switch. Therefore, referring to FIG. 7, the CELL in this embodiment of the present disclosure further includes an extension-arm switch configured to connect the CELL and another CELL. A form of the extension-arm switch is consistent with that of the TOR. However, there is no distinction between upstream and downstream ports for the extension-arm switch, and all ports are used for interconnection between different CELLs.

Figure 7:
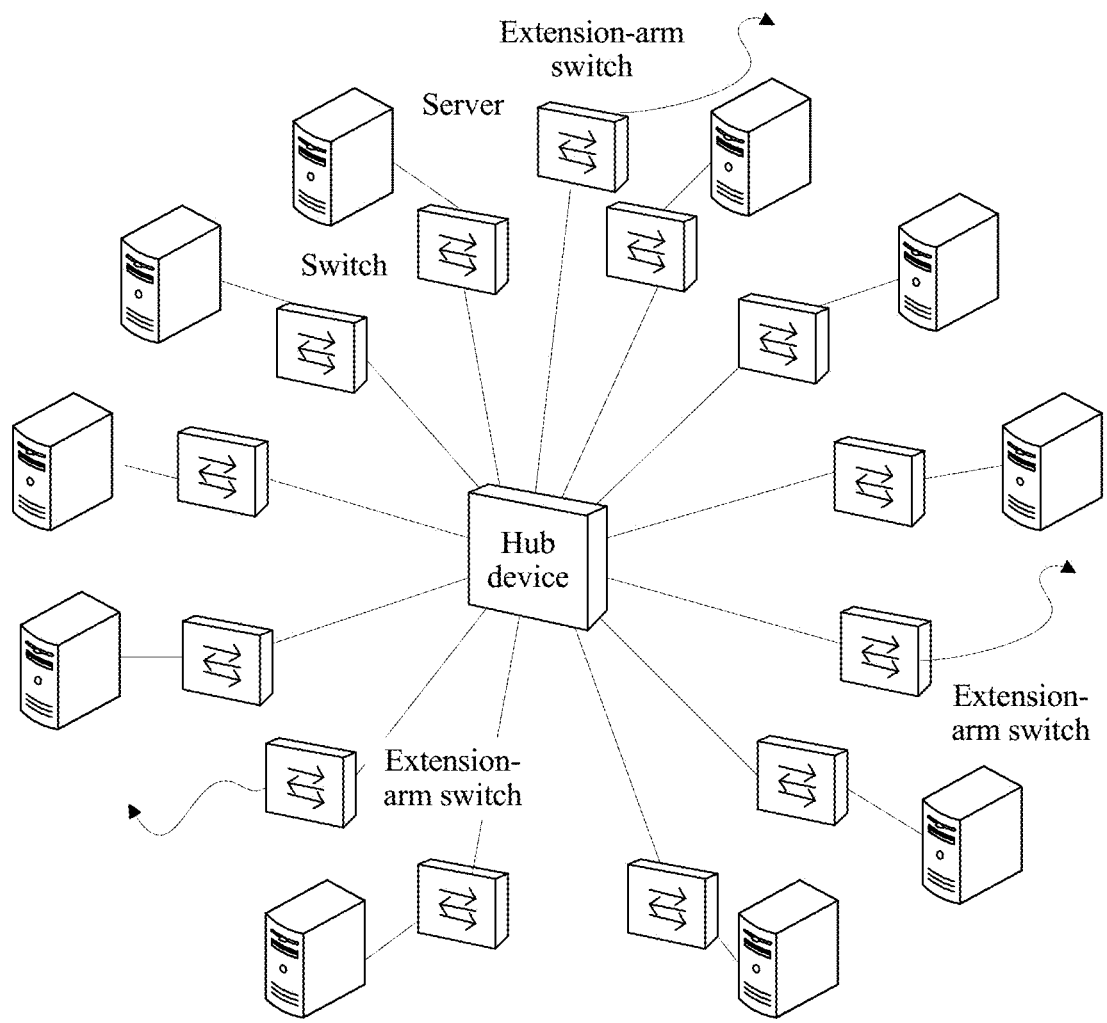
FIG. 7 is a schematic structural diagram of a data center network system that includes an extension-arm switch according to Embodiment 2 of the present disclosure.

Optionally, referring to FIG. 7, the data center network system includes 24 TORs and three extension-arm switches, and a corresponding wavelength is configured for each TOR and each extension-arm switch. Each TOR forms a network-layer connection to other 23 TORs and three extension-arm switches using 27 wavelengths, and each wavelength carries 10 GB bandwidth. At a link layer, in each TOR, 23 input/output ports are connected to other TORs, and three input/output ports are connected to the extension-arm switches. In addition, at the link layer, downstream ports of each TOR are 24 10 GE ports. Each TOR is connected to 24 servers. That is, each server is connected to one 10 GE downstream port of a TOR. In addition, each extension-arm switch at the link layer includes 52 10 GE ports in total, where 26 ports are connected to the CELL, and the remaining 26 ports are connected to other neighboring CELLs.

In the technical solutions in this embodiment of the present disclosure, an existing Ethernet switch does not need to be reconstructed, and it is only necessary to directly add a multiplexer/demultiplexer and a colored optical module between the Ethernet switch and a hub device, thereby reducing device reconstruction costs. In addition, the multiplexer/demultiplexer transmits optical signals with multiple wavelengths using one optical fiber, thereby greatly reducing a quantity of layout cables in the data center network system, and reducing an operation and maintenance difficulty in the data center network system. In addition, when the hub device is an AWG, the AWG, switches, and servers that form the data center network system are all small-size network devices. The small-size network devices are connected to form peer-to-peer, decentralized, undifferentiated interconnections between multiple small devices and construct full connection between the switches in the data center network system. There is no need to use a core layer device and an aggregation layer device, thereby reducing construction costs and maintenance costs of the data center network.

Embodiment 3

Based on the data center network system described in Embodiment 1, for ease of description, a transmission process of multiple signals in this embodiment of the present disclosure is described in detail below using an example in which the data center network includes a source server, a source switch, a hub device, a destination switch, and a destination server, referring to FIG. 8, the source server includes multiple colored optical modules and one source multiplexer/demultiplexer, there are communication connections between all the colored optical modules and the source multiplexer/demultiplexer, the destination server also includes multiple colored optical modules, and one destination multiplexer/demultiplexer, there are communication connections between all the colored optical modules and the destination multiplexer/demultiplexer, there is a communication connection between the source server and the source switch, there is a communication connection between the destination server and the destination switch, and both the source multiplexer/demultiplexer in the source switch and the multiplexer/demultiplexer in the destination switch are connected to the hub device using one optical fiber.

The source server and the destination server are relative concepts. That is, a server that generates a signal is the source server, and a server that receives the signal is the destination server. Any server may be the source server, or may be the destination server.

Referring to FIG. 9, a signal transmission process in the data center network system in this embodiment of the present disclosure includes the following steps.

Step 900: A source switch receives at least two electrical signals, and separately processes each of the at least two signals according to the following processing manner for a first electrical signal: determining an input/output port corresponding to a destination address carried in the first electrical signal, and outputting the first electrical signal using the determined input/output port. Colored optical modules in the source switch convert the electrical signals received by the source switch into optical signals with specific wavelengths. A source multiplexer/demultiplexer in the source switch performs wavelength division multiplexing on the optical signals obtained through conversion by the colored optical modules to form a combined signal, and sends the combined signal to a hub device.

Figure 8:
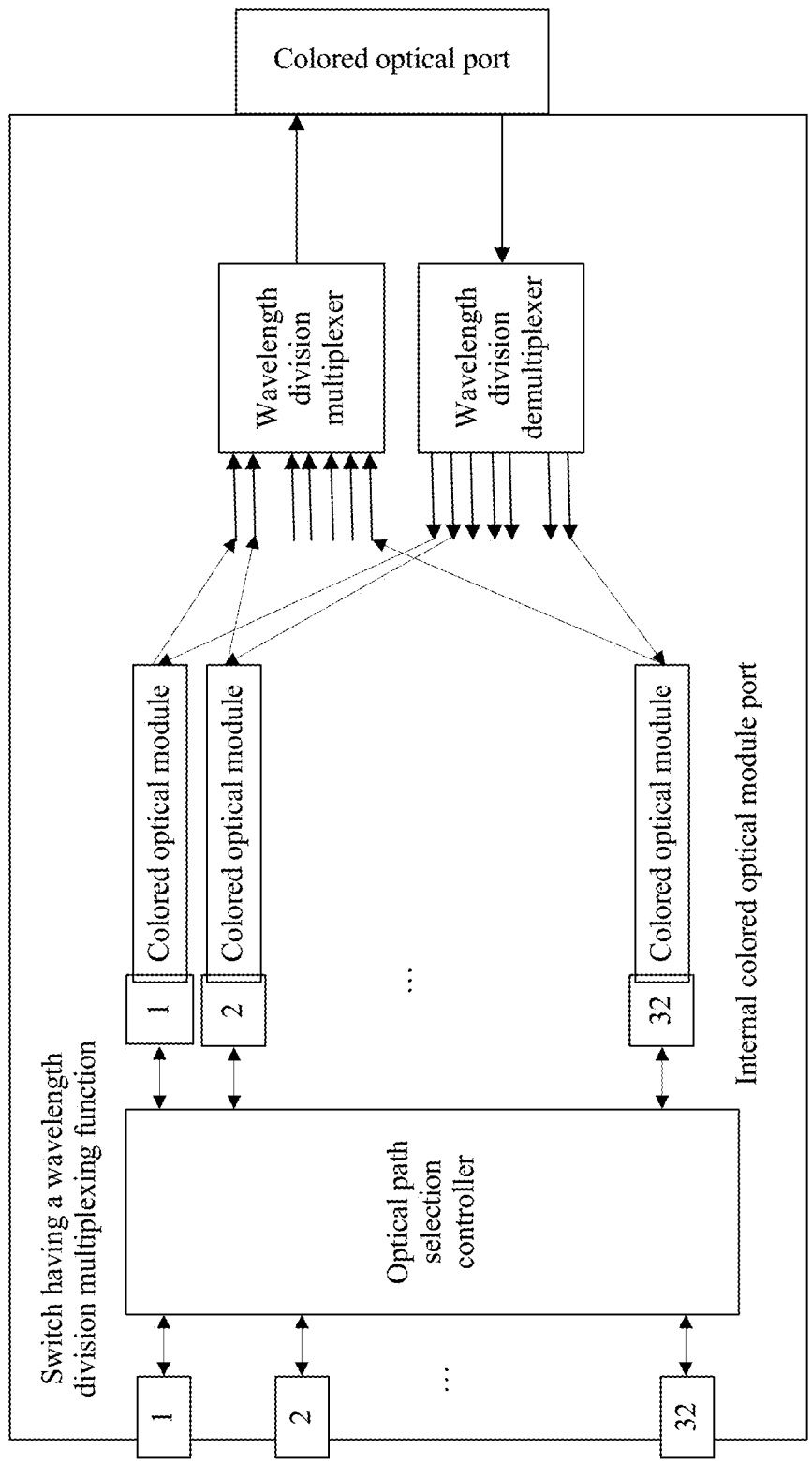
FIG. 8 is a schematic structural diagram of a switch according to Embodiment 3 of the present disclosure.

Referring to FIG. 8, FIG. 8 is a schematic structural diagram of a switch according to this embodiment of the present disclosure. One end of the source switch includes multiple downstream ports. Each of the downstream ports is connected to a different source server. The source switch further includes multiple input/output ports. Each of the input/output ports is connected to a different colored optical module.

In this embodiment of the present disclosure, the at least two electrical signals received by the source switch include any one or a combination of electrical signals sent by a source server that has a communication connection to the source switch, or electrical signals from another switch.

At least two electrical signals sent by the source server that has a communication connection to the source switch include the following case. There is one source server, and the source server generates, according to a service requirement, at least two electrical signals that are sent to at least two destination servers. Alternatively, there are multiple source servers, and each source server separately generates, according to a service requirement, at least two electrical signals that are sent to destination servers.

Optionally, a signal sent by the source server may be an optical signal, or may be an electrical signal. If the signal sent by the source server is an optical signal, because the switch is incapable of processing an optical signal, an optical-to-electrical conversion apparatus further needs to be disposed between the source server and the source switch, or in the source switch. There is a communication connection between the optical-to-electrical conversion apparatus and the source server and between the optical-to-electrical conversion apparatus and the source switch in order to convert an optical signal sent by the source server into an electrical signal, and send the electrical signal obtained through conversion to the source switch.

Optionally, an internal structure of the source switch, a downstream port form of the source switch, and a method for determining a quantity of input/output ports of the source switch are the same as those of the source switch in Embodiment 2. Details are not described herein.

Optionally, the source switch includes a routing policy. The source switch obtains, according to the routing policy, an input/output port corresponding to the electrical signal. A further process is the same as that of the manner of determining an input/output port corresponding to the electrical signal by the source switch in Embodiment 2. Details are not described herein.

Further, when the input/output port corresponding to the destination address is not included in the routing policy included in the source switch, a manner of obtaining an input/output port corresponding to the electrical signal by the source switch is the same as that of the manner of obtaining an input/output port corresponding to the electrical signal by the source switch in Embodiment 2 in a scenario in which the input/output port corresponding to the destination address is not included in the routing policy. Details are not described herein.

Optionally, referring to FIG. 8, the source switch may include an optical path selection controller configured to output, according to the routing policy, a received electrical signal to an input/output port corresponding to the electrical signal.

Further, after receiving the at least two electrical signals, the source switch further needs to determine whether an electrical signal to be transmitted to a server that has a communication connection to the source switch exists in the at least two electrical signals. A processing process is the same as that of the manner of processing the electrical signals by the source switch in Embodiment 2. Details are not described herein.

Further, each colored optical module in the source switch can convert a received electrical signal into an optical signal with a different wavelength. A wavelength of an optical signal that can be processed by each colored optical module is pre-configured according to network deployment during creating of the data center network system.

Optionally, the colored optical module is a 10 GE colored optical module. The 10 GE colored optical module outputs a 1310-nanometer or a 1550-nanometer single-mode optical signal.

In this embodiment of the present disclosure, a function of the source multiplexer/demultiplexer and a manner of processing the optical signal are the same as those of the manner of processing the optical signal by the source multiplexer/demultiplexer in Embodiment 2. Details are not described herein.

Step 910: The hub device receives the combined signal sent by the source multiplexer/demultiplexer, demultiplexes the combined signal to obtain multiple optical signals, sends each of the multiple optical signals to a port corresponding to a destination switch of the optical signal, outputs each optical signal from the corresponding port, and performs wavelength division multiplexing on optical signals output from a same port to form a combined signal.

In this embodiment of the present disclosure, a manner of receiving the combined signal by the hub device, a manner of processing the combined signal by the hub device, and a manner of outputting the combined signal by the hub device are the same as those of the manner of transmitting the combined signal by the hub device in Embodiment 2. Details are not described herein.

Step 920: A destination multiplexer/demultiplexer in the destination switch receives the combined signal from the hub device, demultiplexes the combined signal to obtain multiple optical signals, and separately inputs the multiple optical signals to colored optical modules that are in the destination switch and that are corresponding to wavelengths of the optical signals. A colored optical module in the destination switch converts an optical signal sent by the destination multiplexer/demultiplexer into an electrical signal, and outputs the electrical signal to an input/output port of a destination switch that has a communication connection to the colored optical module. The destination switch obtains a destination address carried in the received electrical signal, and sends the electrical signal to a destination server indicated by the destination address.

In this embodiment of the present disclosure, the destination multiplexer/demultiplexer receives, using one optical fiber between the destination multiplexer/demultiplexer and the hub device, the combined signal sent by the hub device, and performs demultiplexing processing on the combined signal to obtain multiple optical signals. For each obtained optical signal, the destination multiplexer/demultiplexer performs the following operations A mapping relationship between a wavelength and a colored optical module is included in the destination multiplexer/demultiplexer, and the destination multiplexer/demultiplexer searches the mapping relationship stored in the destination multiplexer/demultiplexer for a colored optical module that has a mapping relationship with a wavelength of the optical signal, and sends the optical signal to the found colored optical module.

Optionally, the colored optical module is a 10 GE colored optical module. The 10 GE colored optical module outputs a 1310-nanometer or a 1550-nanometer single-mode optical signal.

In this embodiment of the present disclosure, referring to FIG. 8, a structure and a function of the destination switch are the same as the structure and the function of the source switch. Details are not described herein.

In a specific application scenario, referring to FIG. 8, both the source switch and the destination switch are conventional Ethernet switches. The source server is connected to the source switch using a conventional Ethernet technology. The source switch completes electrical cross-connection conversion from 24 inputs to 26 outputs according to the routing policy stored in the source switch. The source switch includes 24 downstream ports connected to source servers, and 26 input/output ports connected to colored optical modules. Ports obtained by the input/output ports minus the ports used by the source switch to connect to the source servers may be connected to an extension-arm switch.

Optionally, when the source switch and the destination switch are TORs, one 10 Gb direct link may exist between any two TORs, and multiple 10 Gb links may exist between a TOR and an extension-arm switch, and between extension-arm switches. In addition, a port that is of a TOR and that is connected to the hub device is presented as one 10 GE port at a Media Access Control (MAC) layer, and corresponds to one 10 Gb interconnection link between switches. At an optical layer, the 10 GE port is crossly mapped to an optical path whose wavelength is $\lambda_i$ and rate is 10 Gb. In addition, both a port that is of a TOR and that is connected to the hub device, and a port that is in a TOR and that is connected to an extension-arm switch are wavelength division multiplexing ports. Each of the ports carries N optical signals whose wavelengths are respectively $\lambda_1, \lambda_2, \lambda_3, \ldots,$ and $\lambda_N$, and each wavelength corresponds to one 10 Gb link between switches.

In another application scenario, both the source switch and the destination switch are conventional Ethernet switches. The source server is connected to the source switch using a conventional Ethernet technology. The source switch completes electrical cross-connection conversion from 64 inputs to 64 outputs according to the routing policy stored in the source switch. The source switch includes 64 downstream ports connected to source servers, and 64 input/output ports connected to colored optical modules.

The 32 downstream ports may be configured as twenty-four 10 GE ports and two 40 GE ports. The 32 internal ports may be configured as required. For example, if 26 optical signals need to be provided, only 26 colored optical modules are inserted.

In the technical solutions in this embodiment of the present disclosure, the wavelength division multiplexing technology and the Ethernet switch technology are organically combined to implement optical fiber virtualization, thereby greatly reducing a quantity of layout cables in the data center network system, and reducing an operation and maintenance difficulty in the data center network system. In addition, when the hub device is an AWG, the AWG, switches, and servers are all small-size network devices. The small-size network devices are connected to form peer-to-peer, decentralized, undifferentiated interconnections between multiple small devices and construct full connection between the switches in the data center network system, thereby implementing a centralized new data center network architecture. There is no need to use a core layer device and an aggregation layer device, thereby reducing construction costs and maintenance costs of the data center network.

In this embodiment of the present disclosure, a star network topology structure in which one hub device is used as a center forms one CELL. The CELL may be equivalent to a concept in an actual service, such as a service partition, a delivery unit, or a system cluster. In an actual data center network, multiple CELLs may be included, and the CELLs are connected using an extension-arm switch. Therefore, referring to FIG. 7, the CELL in this embodiment of the present disclosure further includes an extension-arm switch configured to connect the CELL and another CELL. A form of the extension-arm switch is consistent with that of the TOR. However, there is no distinction between upstream and downstream ports for the extension-arm switch, and all ports are used for interconnection between different CELLs.

Embodiment 4

Based on the data center network systems described in Embodiment 1 to Embodiment 3, a transmission process of multiple signals in this embodiment of the present disclosure is described in detail below using an example in which a data center network includes a source server, a source switch, a hub device, a destination switch, and a destination server, there are communication connections between the source server and multiple colored optical modules, there are communication connections between all the colored optical modules and one multiplexer/demultiplexer (referred to as a source multiplexer/demultiplexer below), there are communication connections between the destination server and multiple colored optical modules, there are communication connections between all the colored optical modules and one multiplexer/demultiplexer (referred to as a destination multiplexer/demultiplexer below), there is a communication connection between the source server and the source switch, there is a communication connection between the destination server and the destination switch, and both the source multiplexer/demultiplexer and the destination multiplexer/demultiplexer are connected to the hub device using one optical fiber.

The source server and the destination server are relative concepts. That is, a server that generates a signal is the source server, and a server that receives the signal is the destination server. Any server may be the source server, or may be the destination server.

In this embodiment of the present disclosure, the source switch is a switching board (referred to as a source switching board below) based on a frame-shaped server. The source server is plugged into the switching board to establish a communication connection to the source switch. Correspondingly, the destination switch is a switching board (referred to as a destination switching board below) based on a frame-shaped server. The destination server is plugged into the switching board to establish a communication connection to the destination switch.

Optionally, a signal transmission process in the data center network system is the same as the signal transmission process in Embodiment 2. Details are not described herein.

Further, the source switch may be a switch that includes a colored optical module and a source multiplexer/demultiplexer, and the destination switch may be a switch that includes a colored optical module and a destination multiplexer/demultiplexer. In this application scenario, a signal transmission process in the data center network system is similar to that in Embodiment 3. Details are not described herein.

In this embodiment of the present disclosure, a star network topology structure in which one hub device is used as a center forms one CELL. The CELL may be equivalent to a concept in an actual service, such as a service partition, a delivery unit, or a system cluster. In an actual data center network, multiple CELLs may be included, and the CELLs are connected using an extension-arm switch. Therefore, referring to FIG. 7, the CELL in this embodiment of the present disclosure further includes an extension-arm switch configured to connect the CELL and another CELL. A form of the extension-arm switch is consistent with that of the TOR. However, there is no distinction between upstream and downstream ports for the extension-arm switch, and all ports are used for interconnection between different CELLs.

Embodiment 5

Based on the data center network systems described in Embodiment 1 to Embodiment 3, a transmission process of multiple signals in this embodiment of the present disclosure is described in detail below using an example in which a data center network includes a source server, a source switch, a hub device, a destination switch, and a destination server, there are communication connections between the source server and multiple colored optical modules, there are communication connections between all the colored optical modules and one multiplexer/demultiplexer (referred to as a source multiplexer/demultiplexer below), there are communication connections between the destination server and multiple colored optical modules, there are communication connections between all the colored optical modules and one multiplexer/demultiplexer (referred to as a destination multiplexer/demultiplexer below), there is a communication connection between the source server and the source switch, there is a communication connection between the destination server and the destination switch, and both the source multiplexer/demultiplexer and the destination multiplexer/demultiplexer are connected to the hub device using one optical fiber.

The source server and the destination server are relative concepts. That is, a server that generates a signal is the source server, and a server that receives the signal is the destination server. Any server may be the source server, or may be the destination server.

In this embodiment of the present disclosure, the source switch is a switching board (referred to as a source switching board below) based on a frame-shaped server. The source server is plugged into the switching board to establish a communication connection to the source switch. Alternatively, the destination switch is a switching board (referred to as a destination switching board below) based on a frame-shaped server. The destination server is plugged into the switching board to establish a communication connection to the destination switch.

A signal transmission process in the data center network system in this embodiment of the present disclosure is similar to those in Embodiment 2 and Embodiment 4. Details are not described herein.

Further, the source switch may be a switch that includes a colored optical module and a source multiplexer/demultiplexer, and the destination switch may be a switch that includes a colored optical module and a destination multiplexer/demultiplexer. In this application scenario, a signal transmission process in the data center network system is similar to that in Embodiment 3. Details are not described herein.

In this embodiment of the present disclosure, a star network topology structure in which one hub device is used as a center forms one CELL. The CELL may be equivalent to a concept in an actual service, such as a service partition, a delivery unit, or a system cluster. In an actual data center network, multiple CELLs may be included, and the CELLs are connected using an extension-arm switch. Therefore, referring to FIG. 7, the CELL in this embodiment of the present disclosure further includes an extension-arm switch configured to connect the CELL and another CELL. A form of the extension-arm switch is consistent with that of the TOR. However, there is no distinction between upstream and downstream ports for the extension-arm switch, and all ports are used for interconnection between different CELLs.

Embodiment 6

The data center network systems in Embodiment 1 to Embodiment 5 include only one hub device. Referring to FIG. 7, the hub device further includes an extension-arm switch. The extension-arm switch is configured to connect the hub device to another hub device.

Figure 10:
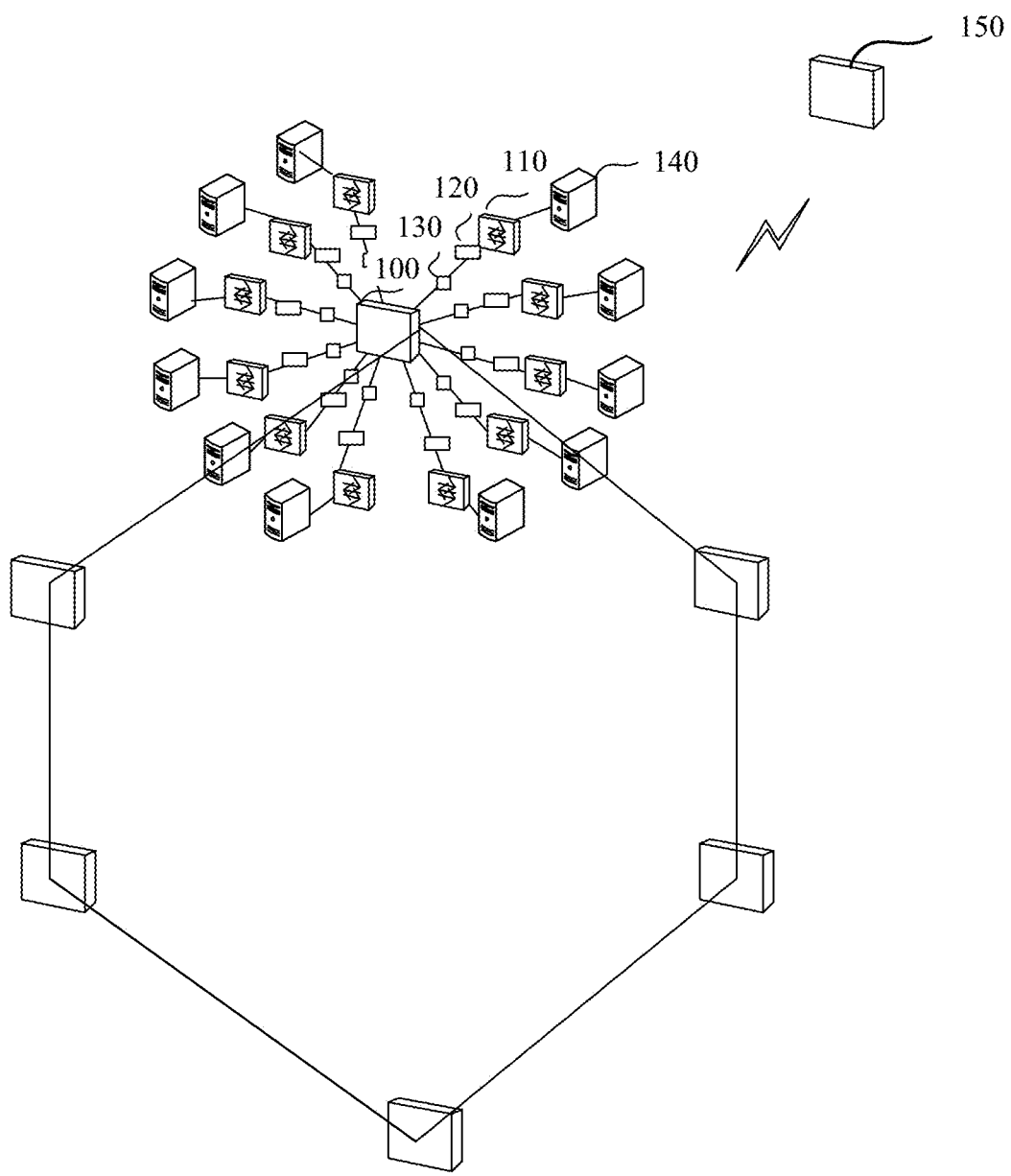
FIG. 10 is a schematic diagram of an architecture of a signal transmission system according to Embodiment 6 of the present disclosure.

Referring to FIG. 10, multiple CELLs form a signal transmission system. The signal transmission system includes at least two star network topology structures, each star network topology structure includes one hub device 100, at least two switches 110, multiple colored optical modules 120, at least two multiplexers/demultiplexers 130, and at least two servers 140, and there is a communication connection between hub devices 100 in the at least two star network topology structures.

In one of the star network topology structures, there is a communication connection between at least one of the at least two switches 110 and at least one server 140, and there are communication connections between different input/output ports of each switch 110 and different colored optical modules 120, there are communication connections between the different colored optical modules 120 that have communication connections to the different input/output ports of each switch 110 and one multiplexer/demultiplexer 130, where different switches 110 are communicatively connected to different multiplexers/demultiplexers 130 using colored optical modules 120, and the at least two switches 110 and the hub device 100 form a star network topology structure using multiplexers/demultiplexers 130 that have communication connection to the at least two switches 110, where the hub device 110 is communicatively connected to different multiplexers/demultiplexers 130 using different ports, and there is a communication connection between any one of the at least two hub devices 100 and at least one other hub device.

Between any two of the star network topology structures, the switch 110 in one of the star network topology structures is configured to receive at least two electrical signals, and separately process each of the at least two electrical signals according to the following processing manner for a first electrical signal, determining an input/output port corresponding to a destination address carried in the first electrical signal, and outputting the first electrical signal using the determined input/output port, where the destination address is used to indicate a destination server, the input/output port corresponding to the destination address is an input/output port corresponding to a destination switch that is communicatively connected to the destination server, the destination server is a server in the other star network topology structure, the destination switch is a switch that is communicatively connected to the destination server, and the at least two electrical signals include any one or a combination of electrical signals sent by a server that has a communication connection to the switch, electrical signals sent by another switch that is in the at least two switches and that belongs to a star network topology structure same as that of the switch, and electrical signals from a switch that belongs to a star network topology structure different from that of the switch.

The colored optical module 120 is configured to receive an electrical signal output by an input/output port of the switch 110 that has a communication connection to the colored optical module 120, and convert the received electrical signal into an optical signal with a specific wavelength, where optical signals obtained through conversion by different colored optical modules 120 that have communication connections to different input/output ports of a switch have different wavelengths.

The multiplexer/demultiplexer 130 is configured to receive multiple optical signals sent by each of multiple colored optical modules 120 that have communication connections to the multiplexer/demultiplexer 130, and perform wavelength division multiplexing on the multiple optical signals to form a combined signal.

The hub device 100 is configured to receive a combined signal sent by a multiplexer/demultiplexer 130 in a star network topology structure same as that of the hub device 100, and/or a combined signal sent by a hub device in a star network topology structure different from that of the hub device, demultiplex the combined signal to obtain multiple optical signals, send each of the multiple optical signals to a port corresponding to a destination switch of the optical signal, output each optical signal from the corresponding port, and perform wavelength division multiplexing on optical signals output from a same port to form a combined signal, where a destination switch of at least one of the obtained multiple optical signals is in another star network topology structure, and an optical signal of the destination switch in the other star network topology structure is output using a port of the hub device, and transmitted to another hub device.

The multiplexer/demultiplexer 130 is further configured to receive a combined signal from a hub device 100 that has a communication connection to the multiplexer/demultiplexer 130, demultiplex the combined signal to obtain multiple optical signals, and separately input the multiple optical signals to colored optical modules 120 corresponding to wavelengths of the optical signals.

Each of the colored optical modules 120 is further configured to receive an optical signal from the multiplexer/demultiplexer 130 that has a communication connection to the colored optical module 120, convert the optical signal into an electrical signal, and output the electrical signal to an input/output port of a switch 110 that has a communication connection to the colored optical module 120.

The switch 110 is further configured to forward an electrical signal received from a colored optical module that has a communication connection to the switch 110 to a destination server 140 of the electrical signal.

Further, the system further includes an SDN controller 150, and there is a communication connection between the SDN controller 150 and each switch 110 in the system.

The switch 110 is further configured to receive at least one electrical signal, and separately process each of the at least one electrical signal according to the following processing manner for a second electrical signal, determining an input/output port corresponding to a destination address carried in the second electrical signal, and sending an overload notification to the SDN controller 150 when the input/output port corresponding to the destination address carried in the second electrical signal is overloaded.

When receiving the notification sent by the switch 110, the SDN controller 150 is configured to select at least one input/output port from input/output ports of the switch 110 that sends the notification except the input/output port corresponding to the destination address in the second electrical signal, and feedback the selected at least one input/output port to the switch 110 that sends the notification.

The switch 110 that is in the at least two switches and that sends the notification to the SDN controller 150 is further configured to output the received at least one electrical signal using the at least one input/output port fed back by the SDN controller 150.

Optionally, the at least one input/output port selected by the SDN controller 150 is at least one input/output port whose load is the smallest in the input/output ports of the switch that sends the notification.

Optionally, the SDN controller 150 selects, according to a load balancing rule, at least one input/output port from the input/output ports of the switch that sends the notification except the input/output port corresponding to the destination address in the second electrical signal.

In this embodiment of the present disclosure, a network formed by multiple CELLs according to a specific rule and topology is referred to as a POD. A scale of the POD is larger than that of a CELL. In an actual networking environment, the POD may be similar to one Available Zone (AZ), and corresponds to one cloud cluster or one equipment room module in an actual scenario.

Figure 11:
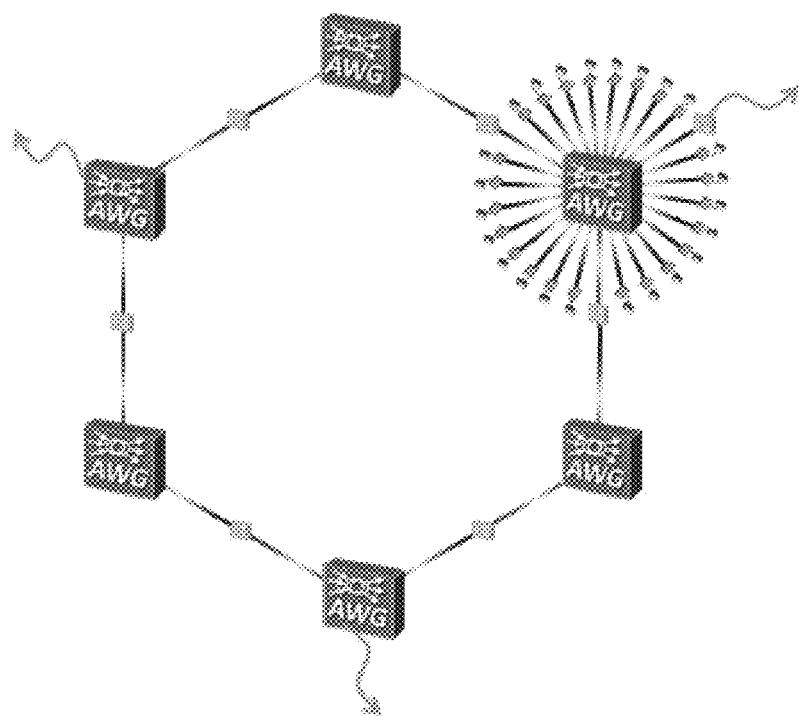
FIG. 11 is a schematic structural diagram of one point of deployment (POD) according to Embodiment 6 of the present disclosure.

Optionally, the POD includes two forms, that is, a standard POD and a non-standard POD. The standard POD meets the following three conditions. Structures of all CELLs included in the POD are the same, that is, all the CELLs have a same quantity of TORs, and a same quantity of extension-arm switches, a same quantity of ports and bandwidth of each TOR, and a same quantity of ports and bandwidth of an extension-arm switch, and connection manners of TORs and extension-arm switches that are included in each CELL are the same. All the CELLs are interconnected using the extension-arm switches to form a ring. For example, referring to FIG. 11, six CELLs form one POD. Each CELL includes 24 TORs and three extension-arm switches. Every two neighboring CELLs are interconnected using an extension-arm switch, or every two neighboring CELLs are interconnected using an extension-arm switch of either CELL. Six extension arms are required in total for implementing connections and constructing a ring network. The non-standard POD has the following features. Networking modes of CELLs in the POD may be different, and different CELLs are freely interconnected using an extension-arm switch, and may not form a ring network.

Figure 12:
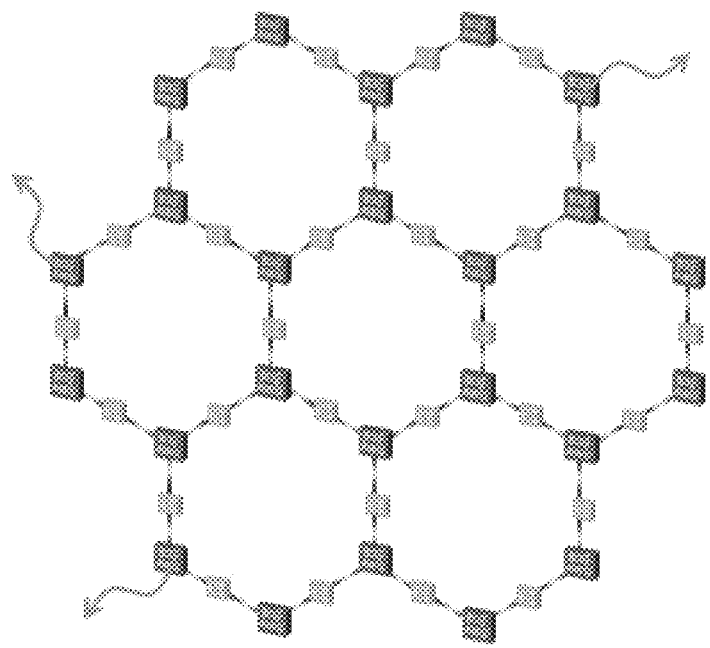
FIG. 12 is a schematic structural diagram of one ZONE according to Embodiment 6 of the present disclosure.

Referring to FIG. 12, a network formed by multiple PODs according to a specific rule and topology is a ZONE. The ZONE is of a honeycomb architecture that is networked through cellular multi-POD interconnection. This networking manner is a standard ZONE networking solution. One ZONE is formed by six PODs through interconnection. Every two neighboring PODs have two overlapped CELLs. Therefore, there are 24 CELLs in total in one ZONE. A unit such as a network outlet may be interconnected using an edge extension-arm switch. For example, a data center network system includes 576 cabinets, and one ZONE including six PODs and 24 CELLs is deployed. Each CELL in the data center network system includes 24 cabinets. Without considering a dual-uplink scenario, each cabinet includes twenty-four 10 GE servers, and the data center network system can accommodate (576*24=13824) servers.

Based on the ZONE, when the source switch and the destination switch are in different PODs, signal transmission needs to be implemented using an AWG shared between the PODs.

Figure 13A:
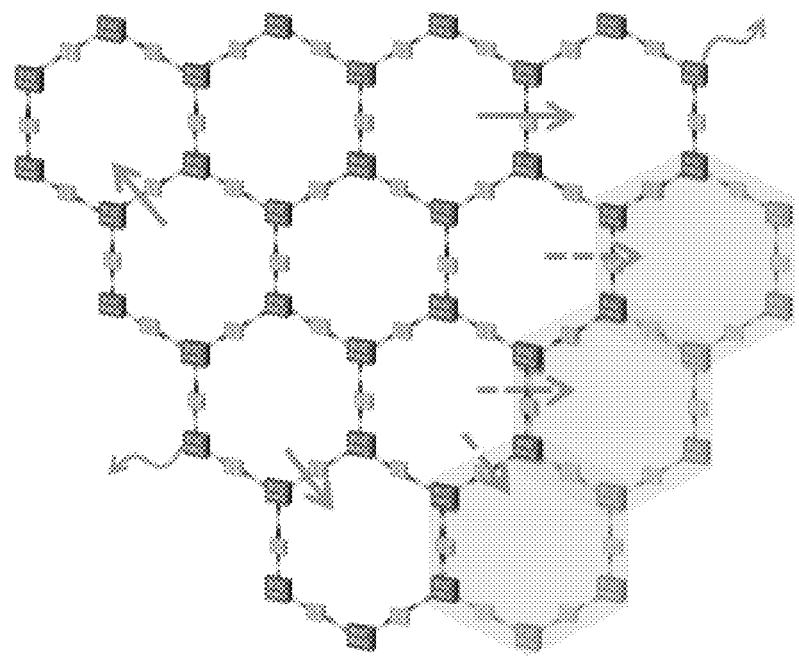
FIG. 13A is a schematic diagram of horizontal expansion of multiple ZONEs according to Embodiment 6 of the present disclosure.
Figure 13B:
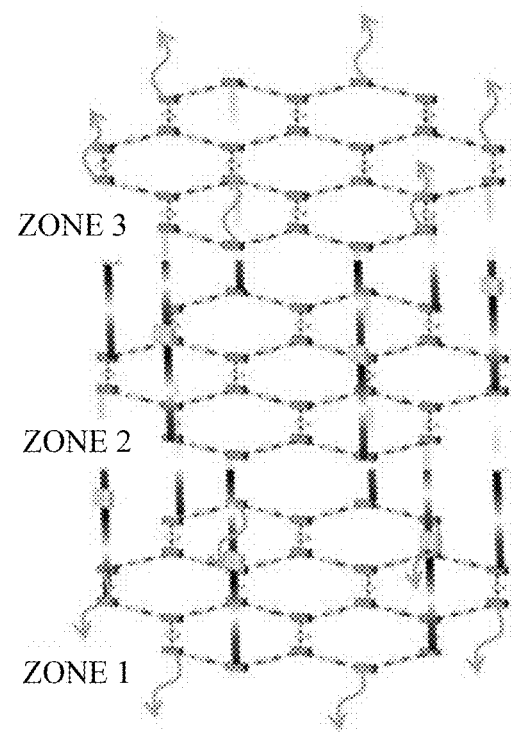
FIG. 13B is a schematic diagram of vertical expansion of multiple ZONEs according to Embodiment 6 of the present disclosure.

Referring to FIG. 13A, multiple ZONEs may be interconnected through horizontal expansion, and the horizontal expansion may be implemented using an extension-arm switch. Referring to FIG. 13B, alternatively, multiple ZONEs may be interconnected through vertical expansion, and the vertical expansion may be implemented using an extension-arm switch. Further, alternatively, multiple ZONEs may be interconnected through free expansion. That is, networking is randomly performed without considering the foregoing standard expansion modes. A networking form and a topology structure are not limited, and may be randomly set by a user according to a specific application scenario.

In the foregoing technical solutions, peer-to-peer small-size devices are used to implement network-wide connection, with no need to use an aggregation layer device and a core layer device, thereby effectively avoiding a network bottleneck. In addition, a decentralized network structure helps expand the data center network, thereby improving system availability.

In conclusion, in the embodiments of the present disclosure, the data center network system uses the star network topology structure. A hub device is used as a center of the star network topology structure. There are communication connections between each hub device and at least two switches. In each star network topology structure, there is a communication connection between at least one of at least two switches and at least one server. In the technical solutions in the present disclosure, each switch has a hub device that has a communication connection to the switch.

The hub device and the switch form a star network topology structure. Compared with a mesh network topology structure, in the star network topology structure, a smaller quantity of cables are laid out between devices such that a quantity of network layout cables can be effectively reduced, and subsequent network maintenance workload can be reduced. In addition, in a current three-layer network architecture, all signals sent from a source server to a destination server need to be forwarded by an aggregation layer device and a core layer device. By comparison, a signal output by the source server in the data center network system in the embodiments of the present disclosure successively passes through the source switch that has a communication connection to the source server, the hub device, and the destination switch that has a communication connection to the destination server in order to arrive at the destination server, and all signals are forwarded only by the hub device. Compared with the three-layer network architecture, a signal is forwarded at a smaller quantity of layers, and therefore this helps implement network structure delayering in the data center network system, thereby reducing energy consumption caused by a core layer device and an aggregation layer device, and effectively reducing system energy consumption and device maintenance costs. In addition, the data center network system further includes a colored optical module. The colored optical module converts an electrical signal sent by a server to a switch into an optical signal such that only an optical signal is transmitted between the hub device and the colored optical module. Because an optical signal has advantages of high transmission reliability, a high transmission speed, and a large transmission data amount, a larger data amount can be carried in the data center network system in the embodiments of the present disclosure, and signal transmission reliability and transmission efficiency are improved.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provides steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations information the embodiments of the present disclosure provided that they fall within the scope of protection defined by the following claims in the present disclosure and their equivalent technologies.

What is claimed is:

1. A data center network system, comprising;
a hub device;
at least two switches coupled to the hub device;
a plurality of colored optical circuits, wherein communication couplings are among different input/output ports of each switch and different ones of the colored optical circuits;
at least two multiplexers/demultiplexers, wherein communication couplings are among the different ones of the colored optical circuits having the communication couplings to the different input/output ports of each switch and one of the at least two multiplexers/demultiplexers, wherein different ones of the switches are communicatively coupled to different ones of the multiplexers/demultiplexers using the colored optical circuits, wherein the at least two switches and the hub device form a star network topology structure using the at least two multiplexers/demultiplexers, and wherein the hub device is separately communicatively coupled to the different ones of the multiplexers/demultiplexers using different ports; and
at least two servers, wherein a communication coupling is between at least one of the at least two switches and at least one server of the at least two servers,
wherein a switch of the at least two switches is configured to:
receive at least two electrical signals; and
separately process each of the at least two electrical signals according to the following processing manner for a first electrical signal:
output the first electrical signal using an input/output port corresponding to a destination address carried in the first electrical signal, wherein the destination address indicates a destination server, wherein the input/output port corresponds to the destination address, wherein the destination address comprises an input/output port corresponding to a destination switch, wherein the destination switch is communicatively coupled to the destination server, wherein the destination server comprises one of the at least two servers, wherein the destination switch is communicatively coupled to the destination server, and wherein either the at least two electrical signals comprise any one or a combination of electrical signals from a server having a communication coupling to the switch or electrical signals from another switch in the at least two switches, wherein a colored optical circuit of the colored optical circuits is configured to:
  receive an electrical signal from an input/output port of a switch having a communication coupling to the colored optical circuit; and
  convert the received electrical signal into an optical signal with a specific wavelength, wherein optical signals obtained through conversion by different colored optical circuits having communication couplings to different input/output ports of a switch have different wavelengths, wherein a selected multiplexer/demultiplexer of the multiplexers/demultiplexers is configured to:
  receive a plurality of first optical signals from each of a plurality of colored optical circuits having communication couplings to the multiplexer/demultiplexer; and
  perform wavelength division multiplexing on the first optical signals to form a first combined signal, wherein the hub device is configured to:
  receive the first combined signal from the multiplexer/demultiplexer;
  demultiplex the first combined signal to obtain a plurality of second optical signals;
  send each of the second optical signals to a port corresponding to a destination switch of a corresponding second optical signal;
  output each second optical signal from the corresponding port; and
  perform the wavelength division multiplexing on second optical signals output from a same port to form a second combined signal, wherein the selected multiplexer/demultiplexer is further configured to:
  receive the second combined signal from the hub device;
  demultiplex the second combined signal to obtain a plurality of third optical signals; and
  separately input the third optical signals to colored optical circuits corresponding to wavelengths of the third optical signals, wherein the colored optical circuit is further configured to:
  receive a third optical signal from the multiplexer/demultiplexer;
  convert the third optical signal into another electrical signal; and
  output the other electrical signal to the input/output port of the switch having the communication coupling to the colored optical circuit, and wherein the switch is further configured to forward the other electrical signal received from the colored optical circuit to a destination server of the other electrical signal.

2. The system of claim 1, further comprising a software-defined networking (SDN) controller coupled to each switch in the system, wherein the switch is further configured to:
  receive at least one electrical signal; and
  separately process each of the at least one electrical signal according to the following processing manner for a second electrical signal:
    determining an input/output port corresponding to a destination address carried in the second electrical signal; and
    sending an overload notification to the SDN controller when the input/output port corresponding to the destination address carried in the second electrical signal is overloaded, wherein the SDN controller is configured to:
    select at least one input/output port from input/output ports of the switch sending the notification except the input/output port corresponding to the destination address in the second electrical signal when receiving the notification from the switch; and
    feedback the selected at least one input/output port to the switch sending the notification, and
  wherein the switch in the at least two switches sending the notification to the SDN controller is further configured to output the received at least one electrical signal using the at least one input/output port received from the SDN controller.

3. The system of claim 2, wherein the at least one input/output port selected by the SDN controller comprises at least one input/output port whose load is the smallest in the input/output ports of the switch sending the notification.

4. The system of claim 2, wherein the SDN controller is further configured to select, according to a load balancing rule, at least one input/output port from the input/output ports of the switch sending the notification except the input/output port corresponding to the destination address in the second electrical signal.

5. The system of claim 1, wherein at least one of the colored optical circuits comprised in the switch includes the communication coupling to the colored optical circuit.

6. The system of claim 1, wherein the hub device comprises an arrayed waveguide grating (AWG).

7. A signal transmission system, comprising at least two star network topology structures, wherein each star network topology structure comprises:
  a hub device, wherein a communication coupling is between hub devices in the at least two star network topology structures;
  at least two switches coupled to the hub device;
  a plurality of colored optical circuits, wherein communication couplings are among different input/output ports of each switch and different ones of the colored optical circuits;
  at least two multiplexers/demultiplexers, wherein communication couplings are among the different ones of the colored optical circuits having the communication couplings to the different input/output ports of each switch and one of the at least two multiplexers/demultiplexers, wherein different ones of the switches are communicatively coupled to different ones of the multiplexers/demultiplexers using the colored optical circuits, wherein the at least two switches and the hub device forming a star network topology structure use the at least two multiplexers/demultiplexers, and wherein the hub device is separately communicatively coupled to the different ones of the multiplexers/demultiplexers using different ports; and at least two servers, wherein a communication coupling is between at least one of the at least two switches and at least one server of the at least two servers, wherein between any two of the star network topology structures, a switch in one of the at least two star network topology structures is configured to:

receive at least two electrical signals; and separately process each of the at least two electrical signals according to the following processing manner for a first electrical signal:

output the first electrical signal using an input/output port corresponding to a destination address indicating a destination server carried in the first electrical signal, wherein the input/output port corresponding to the destination address comprising an input/output port corresponding to a destination switch is communicatively coupled to the destination server, wherein the destination server comprises a server in the other star network topology structure, wherein the destination switch is communicatively coupled to the destination server, wherein the at least two electrical signals comprising any one or a combination of electrical signals from a server having a communication coupling to the switch, and wherein either electrical signals from another switch belong to a same star network topology structure as that of the switch, or electrical signals from a switch belong to a star network topology structure that is different from that of the switch, wherein a colored optical circuit is configured to:

receive an electrical signal from an input/output port of a switch having a communication coupling to the colored optical circuit; and convert the received electrical signal into an optical signal with a specific wavelength, wherein optical signals obtained through conversion by different colored optical circuits have communication couplings to different input/output ports of a switch have different wavelengths, wherein a selected multiplexer/demultiplexer is configured to:

receive a plurality of first optical signals from each of a plurality of colored optical circuits having communication couplings to the multiplexer/demultiplexer; and perform wavelength division multiplexing on the first optical signals to form a first combined signal, wherein the hub device is configured to:

receive a combined signal from a selected multiplexer/demultiplexer in a same star network topology structure as that of the hub device, and a combined signal from a hub device in a star network topology structure that is different from that of the hub device;

demultiplex the combined signal to obtain a plurality of second optical signals;

send each of the second optical signals to a port corresponding to a destination switch of a corresponding second optical signal;

output each second optical signal from the corresponding port; and perform the wavelength division multiplexing on second optical signals output from a same port to form a second combined signal, wherein a destination switch of at least one of the obtained second optical signals is in another star network topology structure, and wherein an optical signal of the destination switch in the other star network topology structure is output using a port of the hub device, and transmitted to another hub device, wherein the selected multiplexer/demultiplexer is further configured to:

receive a combined signal from a hub device having a communication coupling to the multiplexer/demultiplexer;

demultiplex the received combined signal to obtain a plurality of third optical signals; and separately input the third optical signals to colored optical circuits corresponding to wavelengths of the third optical signals;

wherein the colored optical circuit is further configured to:

receive a third optical signal from the selected multiplexer/demultiplexer having a communication coupling to the colored optical circuit;

convert the third optical signal into another electrical signal; and output the other electrical signal to the input/output port of the switch having the communication coupling to the colored optical circuit, and wherein the switch is further configured to forward the other electrical signal received from the colored optical circuit having the communication coupling to the switch to a destination server of the other electrical signal.

8. The system of claim 7, further comprising a software-defined networking (SDN) controller coupled to each switch in the system, and wherein the switch is further configured to:

receive at least one electrical signal; and separately process each of the at least one electrical signal according to the following processing manner for a second electrical signal:

send an overload notification to the SDN controller when an input/output port corresponding to the destination address carried in the second electrical signal is overloaded, wherein the SDN controller is configured to:

select at least one input/output port from input/output ports of the switch sending the notification except the input/output port corresponding to the destination address in the second electrical signal when receiving the notification from the switch; and feedback the selected at least one input/output port to the switch sending the notification, and wherein the switch in the at least two switches sending the notification to the SDN controller is further configured to output the received at least one electrical signal using the at least one input/output port received from the SDN controller.

9. The system of claim 8, wherein the at least one input/output port selected by the SDN controller comprises at least one input/output port whose load comprises the smallest in the input/output ports of the switch sending the notification.

10. The system of claim 8, wherein the SDN controller is further configured to select, according to a load balancing rule, at least one input/output port from the input/output ports of the switch sending the notification except the input/output port corresponding to the destination address in the second electrical signal.

11. The system of claim 7, further comprising an extension-arm switch, and wherein the hub device is communicatively coupled to at least one other hub device using the extension-arm switch.

12. The system of claim 7, wherein the hub device is further configured to:
  receive a combined signal from a hub device in a star network topology structure different from that of the hub device;
  demultiplex the received combined signal to obtain a plurality of fourth optical signals;
  send each of the fourth optical signals to a port corresponding to a destination switch of a corresponding fourth optical signal;
  output each fourth optical signal from the corresponding port; and
  perform the wavelength division multiplexing on fourth optical signals output from a same port to form another combined signal, wherein a destination switch of at least one of the obtained fourth optical signals is in another star network topology structure, and wherein an optical signal of the destination switch in the other star network topology structure is output using a port of the hub device, and transmitted to another hub device.

13. A data center network system, comprising:
  a hub device;
  at least two switches coupled to the hub device;
  a plurality of colored optical circuits, wherein communication couplings are among different input/output ports of each switch and different ones of the colored optical circuits;
  at least two multiplexers/demultiplexers, wherein communication couplings are among the different ones of the colored optical circuits having the communication couplings to the different input/output ports of each switch and one of the multiplexers/demultiplexers, wherein different ones of the switches are communicatively coupled to the hub device via different ones of the multiplexers/demultiplexers using the colored optical circuits, wherein the at least two switches and the hub device form a star network topology structure using the at least two multiplexers/demultiplexers, and wherein the hub device is separately communicatively coupled to the different ones of the multiplexers/demultiplexers using different ports; and
  at least two servers, wherein a communication coupling is between at least one of the at least two switches and at least one server of the at least two servers,
  wherein a switch of the at least two switches is configured to:
    receive at least two electrical signals; and
    separately process each of the at least two electrical signals according to the following processing manner for a first electrical signal:
      output the first electrical signal using an input/output port corresponding to a destination address carried in the first electrical signal,
  wherein a colored optical circuit of the colored optical circuits is configured to:
    receive an electrical signal from an input/output port of a switch having a communication coupling to the colored optical circuit; and
    convert the received electrical signal into an optical signal with a specific wavelength,
  wherein a selected multiplexer/demultiplexer of the multiplexers/demultiplexers is configured to:
    receive a plurality of first optical signals from each of a plurality of colored optical circuits having communication couplings to the multiplexer/demultiplexer; and
    perform wavelength division multiplexing on the first optical signals to form a first combined signal,
  wherein the hub device is configured to:
    receive the first combined signal from the multiplexer/demultiplexer;
    demultiplex the first combined signal to obtain a plurality of second optical signals; and
    send each of the second optical signals,
  wherein the system further comprises a software-defined networking (SDN) controller coupled each switch in the system, wherein the other switch is further configured to:
  send an overload notification to the SDN controller when an input/output port corresponding to a destination address carried in a second electrical signal is overloaded,
  wherein the SDN controller is configured to:
    select at least one different input/output port from input/output ports of the other switch when receiving the overload notification from the other switch; and
    feedback the selected at least one input/output port to the other switch sending the notification, and
  wherein the other switch sending the overload notification to the SDN controller is further configured to output the received electrical signal using the at least one input/output port received from the SDN controller.

14. The system of claim 13, wherein the hub device is further configured to:
  perform the wavelength division multiplexing on second optical signals output from a same port to form a second combined signal; and
  send the second combined signal to another multiplexer/demultiplexer,
  wherein the other multiplexer/demultiplexer is configured to:
    receive the second combined signal from the hub device;
    demultiplex the second combined signal to obtain a plurality of third optical signals; and
    separately input the third optical signals to another colored optical circuit corresponding to wavelengths of the third optical signals,
  wherein the other colored optical circuit is configured to:
    receive a third optical signal from the other multiplexer/demultiplexer;
    convert the third optical signal into another electrical signal; and
    output the other electrical signal to an input/output port of another switch having a communication coupling to the other colored optical circuit, and
  wherein the other switch is further configured to forward the electrical signal received from the other colored optical circuit to a destination server of the other electrical signal, wherein the destination server corresponds to the destination address.

15. The system of claim 14, wherein the SDN controller is further configured to select, according to a load balancing rule, at least one different input/output port from the input/output ports of the other switch sending the notification except the input/output port corresponding to the destination address in the second electrical signal.

16. A data center network system, comprising:
a hub device;
at least two switches coupled to the hub device;
a plurality of colored optical circuits, wherein communication couplings are among different input/output ports of each switch and different ones of the colored optical circuits;
at least two multiplexers/demultiplexers, wherein communication couplings are among the different ones of the colored optical circuits having the communication couplings to the different input/output ports of each switch and one of the at least two multiplexers/demultiplexers, wherein different ones of the switches are communicatively coupled to different ones of the multiplexers/demultiplexers using the colored optical circuits, wherein the at least two switches and the hub device form a star network topology structure using the at least two multiplexers/demultiplexers, and wherein the hub device is separately communicatively coupled to the different ones of the multiplexers/demultiplexers using different ports; and
at least two servers, wherein a communication coupling is between at least one of the at least two switches and at least one server of the at least two servers,
wherein a switch of the at least two switches is configured to:
receive at least two electrical signals; and
separately process each of the at least two electrical signals according to the following processing manner for a first electrical signal:
output the first electrical signal using an input/output port corresponding to a destination address carried in the first electrical signal,
wherein a colored optical circuit of the colored optical circuits is configured to:
receive an electrical signal from an input/output port of a switch having a communication coupling to the colored optical circuit; and
convert the received electrical signal into an optical signal with a specific wavelength,
wherein a selected multiplexer/demultiplexer of the multiplexers/demultiplexers is configured to:
receive a plurality of first optical signals from each of a plurality of colored optical circuits having communication couplings to the multiplexer/demultiplexer; and
perform wavelength division multiplexing on the first optical signals to form a first combined signal,
wherein the hub device is configured to:
receive the first combined signal from the selected multiplexer/demultiplexer;
demultiplex the first combined signal to obtain a plurality of second optical signals; and
send each of the second optical signals, and
further comprising a software-defined networking (SDN) controller coupled to each switch in the system, wherein the switch is further configured to:
send an overload notification to the SDN controller when an input/output port corresponding to a destination address carried in a second electrical signal is overloaded,
wherein the SDN controller is configured to:
select at least one different input/output port from input/output ports of the switch when receiving the notification from the switch; and
feedback the selected at least one input/output port to the switch sending the notification, and
wherein the switch sending the notification to the SDN controller is further configured to output the received electrical signal using the at least one input/output port received from the SDN controller.

17. The system of claim 16, wherein the SDN controller is further configured to select, according to a load balancing rule, at least one different input/output port from the input/output ports of the switch sending the notification except the input/output port corresponding to the destination address in the second electrical signal.

18. The system of claim 16, wherein at least one of the colored optical circuits comprises in the switch having the communication coupling to the colored optical circuit.

19. The system of claim 16, wherein the hub device comprises an arrayed waveguide grating (AWG).

* * * * *

UNITED STATES PATENT AND TRADEMARK OFFICE
CERTIFICATE OF CORRECTION

PATENT NO. : 10,454,585 B2
APPLICATION NO. : 15/991830
DATED : October 22, 2019
INVENTOR(S) : Yaobing Cao et al.

It is certified that error appears in the above-identified patent and that said Letters Patent is hereby corrected as shown below:

On the Title Page

Item (56) References, First Reference: "Vandat" should read "Vahdat"

Signed and Sealed this
Tenth Day of December, 2019

Andrei Iancu
*Director of the United States Patent and Trademark Office*